US011943879B2

(12) United States Patent
Shin et al.

(10) Patent No.: US 11,943,879 B2
(45) Date of Patent: *Mar. 26, 2024

(54) DISPLAY DEVICE

(71) Applicant: Samsung Display Co., Ltd., Yongin-si (KR)

(72) Inventors: Jaiku Shin, Hwaseong-si (KR); Sung Chul Choi, Hwaseong-si (KR)

(73) Assignee: SAMSUNG DISPLAY CO., LTD., Yongin-si (KR)

(*) Notice: Subject to any disclaimer, the term of this patent is extended or adjusted under 35 U.S.C. 154(b) by 0 days.

This patent is subject to a terminal disclaimer.

(21) Appl. No.: 18/098,282

(22) Filed: Jan. 18, 2023

(65) Prior Publication Data

US 2023/0156930 A1 May 18, 2023

Related U.S. Application Data

(63) Continuation of application No. 17/333,486, filed on May 28, 2021, now Pat. No. 11,570,911.

(30) Foreign Application Priority Data

Aug. 20, 2020 (KR) .................. 10-2020-0104404
Jan. 20, 2021 (KR) .................. 10-2021-0007785

(51) Int. Cl.
*G06F 3/046* (2006.01)
*H05K 5/00* (2006.01)
(52) U.S. Cl.
CPC .......... *H05K 5/0017* (2013.01); *G06F 3/046* (2013.01); *G06F 2203/04102* (2013.01); *G06F 2203/04107* (2013.01)

(58) Field of Classification Search
CPC .... H05K 5/0017; H05K 9/0054; G06F 3/046; G06F 2203/04102; G06F 2203/04107; G06F 1/1641; G06F 1/1643; G06F 3/0412; G09F 9/301
See application file for complete search history.

(56) References Cited

U.S. PATENT DOCUMENTS

| 9,678,604 | B2 | 6/2017 | Lee |
| 10,551,880 | B1* | 2/2020 | Ai .................. G06F 1/1641 |
| 10,747,269 | B1* | 8/2020 | Choi ............... H04M 1/0237 |

(Continued)

FOREIGN PATENT DOCUMENTS

| KR | 10-1750564 | 6/2017 |
| KR | 10-2020-0061272 | 6/2020 |
| KR | 10-2020-0084495 | 7/2020 |

*Primary Examiner* — Ibrahim A Khan
(74) *Attorney, Agent, or Firm* — KILE PARK REED & HOUTTEMAN PLLC

(57) ABSTRACT

A display device includes a display panel and a lower member disposed below the display panel. The display panel includes a first non-folding region, a second non-folding region, and a folding region disposed between the first non-folding region and the second non-folding region. The lower member includes a support layer and a digitizer. The support layer comprises a first support part disposed below the first non-folding region, and having insulating property, and a second support part disposed below the second non-folding region and having insulating property. The digitizer is disposed below the first support part and the second support part.

20 Claims, 23 Drawing Sheets

(56) References Cited

U.S. PATENT DOCUMENTS

| | | | |
|---|---|---|---|
| 11,009,921 B1* | 5/2021 | Bharadwaj | G09F 9/301 |
| 11,152,580 B2* | 10/2021 | Kawaguchi | H05B 33/04 |
| 11,296,156 B2 | 4/2022 | Kim et al. | |
| 11,698,704 B2* | 7/2023 | Yoo | H10K 59/65 |
| | | | 345/174 |
| 2009/0160789 A1* | 6/2009 | Kreit | H03K 17/97 |
| | | | 345/173 |
| 2015/0346776 A1* | 12/2015 | Miyake | G06F 3/0202 |
| | | | 345/174 |
| 2016/0098132 A1* | 4/2016 | Kim | G06F 1/1652 |
| | | | 345/173 |
| 2016/0165697 A1* | 6/2016 | Jang | G06F 3/041 |
| | | | 313/511 |
| 2016/0259430 A1* | 9/2016 | Hong | G06F 1/163 |
| 2016/0313769 A1* | 10/2016 | Yoshitani | G06F 1/1656 |
| 2017/0031389 A1* | 2/2017 | Yoo | G06F 3/0443 |
| 2017/0061836 A1* | 3/2017 | Kim | G06F 1/1626 |
| 2017/0077447 A1* | 3/2017 | Kang | H10K 59/122 |
| 2017/0352834 A1* | 12/2017 | Kim | G02F 1/133305 |
| 2018/0033979 A1* | 2/2018 | Jang | B32B 27/322 |
| 2018/0090702 A1* | 3/2018 | Um | H10K 50/844 |
| 2018/0188838 A1* | 7/2018 | An | H01Q 7/00 |
| 2018/0249584 A1* | 8/2018 | Kim | H05K 5/0017 |
| 2018/0322848 A1* | 11/2018 | Wu | G09G 5/00 |
| 2018/0324964 A1* | 11/2018 | Yoo | H01Q 1/2266 |
| 2019/0061318 A1* | 2/2019 | Jung | B32B 7/12 |
| 2019/0146556 A1* | 5/2019 | Mizoguchi | G06F 1/1681 |
| | | | 361/679.27 |
| 2019/0248102 A1* | 8/2019 | Song | B32B 3/30 |
| 2020/0168670 A1* | 5/2020 | Kim | H10K 59/1213 |
| 2020/0209998 A1 | 7/2020 | Shin et al. | |
| 2020/0326751 A1* | 10/2020 | Kim | G06F 1/1616 |
| 2020/0371628 A1* | 11/2020 | Chang | H05K 3/007 |
| 2020/0401187 A1* | 12/2020 | Noh | G06F 1/1684 |
| 2021/0019009 A1* | 1/2021 | Jung | G06F 3/044 |
| 2021/0091317 A1* | 3/2021 | Zhu | H04M 1/0268 |
| 2021/0397221 A1* | 12/2021 | Hwang | G06F 3/041 |
| 2022/0019330 A1* | 1/2022 | Chang | G06F 1/1641 |

* cited by examiner

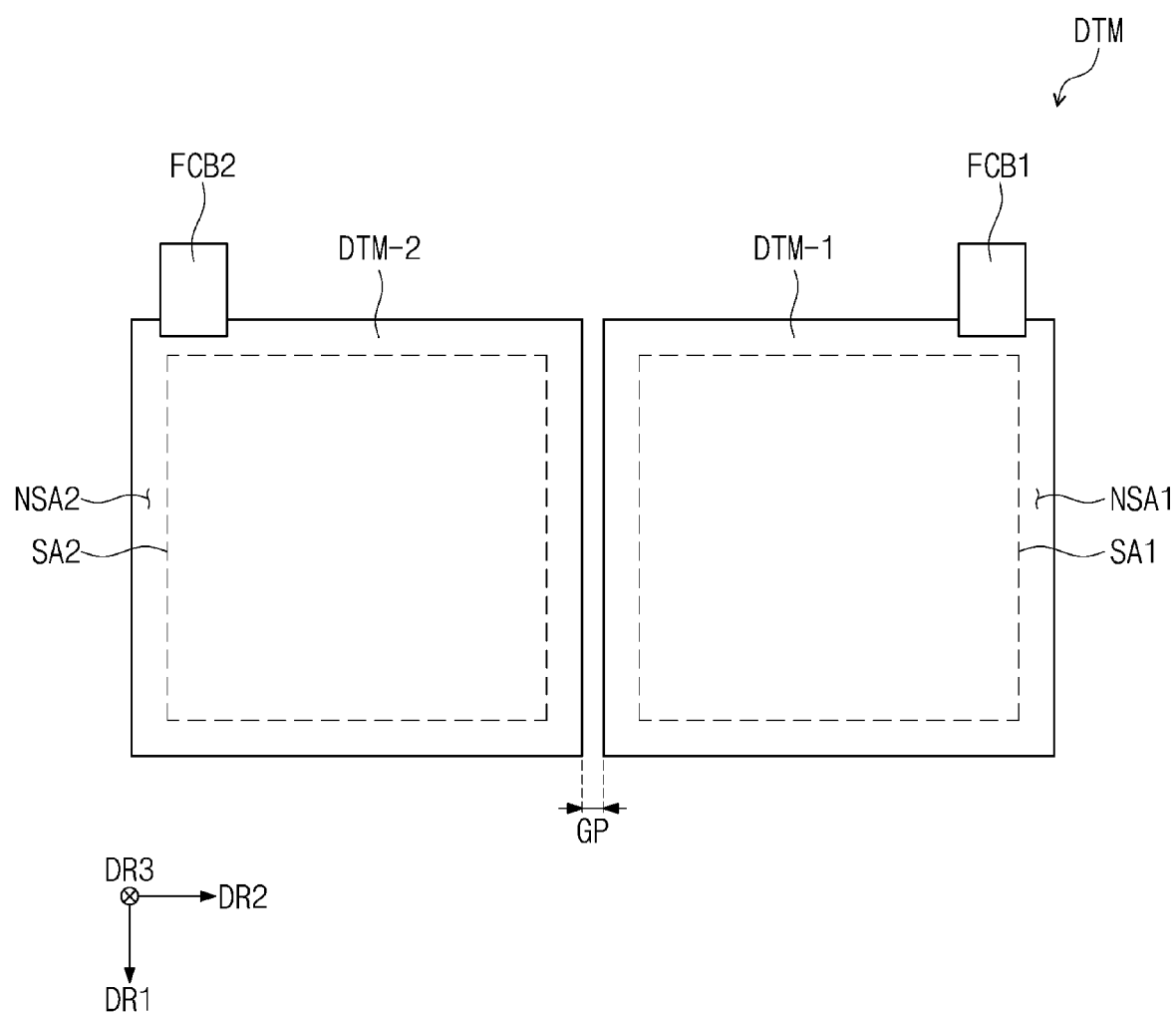

DISPLAY DEVICE

CROSS-REFERENCE TO RELATED APPLICATIONS

This is a continuation application of U.S. patent application Ser. No. 17/333,486, filed May 28, 2021, now U.S. Pat. No. 11,570,911, which issued Jan. 31, 2023, the entire contents of which are incorporated herein by reference. U.S. patent application Ser. No. 17/333,486 claims priority to and benefits of Korean Patent Application Nos. 10-2020-0104404 and 10-2021-0007785 under 35 U.S.C. § 119, filed on Aug. 20, 2020 and Jan. 20, 2021, respectively, in the Korean Intellectual Property Office, the entire contents of which are incorporated herein by reference.

BACKGROUND

The disclosure herein relates to a display device, and more specifically, to a foldable display device.

Display devices each include a display region activated in response to an electrical signal. Display devices may detect an input applied from the outside through the display region and provide information to a user by displaying various images. Recently, while display devices having various shapes have been developed, display regions having various shapes are being implemented.

SUMMARY

The disclosure provides a foldable display device having a digitizer with improved sensitivity and less defects in viewability.

An embodiment of the disclosure provides a display device that may include a display panel and a lower member disposed below the display panel. The display panel may include a first non-folding region, a second non-folding region, and a folding region disposed between the first non-folding region and the second non-folding region. The lower member may include a support layer and a digitizer. The support layer may include a first support part disposed below the first non-folding region, and having insulating property, and a second support part disposed below the second non-folding region and having insulating property. The digitizer may be disposed below the first support part and the second support part.

In an embodiment, the support layer may further include a folding part disposed below the folding region, disposed between the first support part and the second support part, and including openings.

In an embodiment, the lower member may further include a hole passing through one of the first support part and the second support part.

In an embodiment, the hole may pass through the first support part, the first support part may comprise plastic, and the second support part may comprise glass fiber-reinforced plastic or glass.

In an embodiment, the folding part may be spaced apart from the first support part and the second support part in a plan view.

In an embodiment, the lower member may further comprise a barrier layer overlapping the folding part, the first support part, and the second support part, a cover layer overlapping the folding part, the first support part and the second support part, a first adhesive layer boding the barrier layer and the support layer, a second adhesive layer bonding the cover layer and the support layer, and a third adhesive layer bonding the cover layer and the digitizer.

In an embodiment, the first adhesive layer and the third adhesive layer may each comprise a first part and a second part which are spaced apart from each other. The folding part may be entirely disposed between the first part of the first adhesive layer and the second part of the first adhesive layer in a plan view. The folding part may be disposed in a separated region between the first part of the third adhesive layer and the second part of the third adhesive layer in a plan view.

In an embodiment, the support layer may further include a first coupling part disposed between the folding part and the first support part and coupling the folding part to the first support part. The support layer may include a second coupling part disposed between the folding part and the second support part and coupling the folding part to the second support part.

In an embodiment, the folding part may include metal. The first support part and the second support part may include glass, glass fiber-reinforced plastic, or plastic.

In an embodiment, the folding part, the first support part and the second support part may be adhered to a same adhesive layer.

In an embodiment, the folding part, the first support part and the second support part may be directly coupled to the folding part.

In an embodiment, the support layer may further include a flattened part disposed on the folding part, the first support part, and the second support part, and the flattened part, the first support part, and the second support part may be integral with each other.

In an embodiment, the support layer may further include an edge part extending from the folding part and surrounding side surfaces of the first support part and the second support part.

In an embodiment, the support layer may further include a reinforced part overlapping a portion of the first support part and a portion of the second support part and extending from a side of the edge part to another side of the edge part.

In an embodiment, the lower member may further include a cover layer overlapping at least the folding part and disposed below the folding part.

In an embodiment, the cover layer may further overlap the first support part and the second support part.

In an embodiment, the digitizer may include a first digitizer including a first sensing region disposed below the first support part, and a second digitizer including a second sensing region disposed below the second support part and spaced apart from the first digitizer.

In an embodiment, the lower member may further include a first electromagnetic shield layer disposed on a lower surface of the first digitizer, and a second electromagnetic shield layer disposed on a lower surface of the second digitizer.

In an embodiment, the lower member may further include a first metal plate disposed on a lower surface of the first digitizer, and a second metal plate disposed on a lower surface of the second digitizer.

In an embodiment, the lower member may further include a panel protection layer disposed under the display panel, a barrier layer disposed under the panel protection layer a first adhesive layer bonding the barrier layer and the first support part, and a second adhesive layer bonding the barrier layer and the second support part and spaced apart from the first adhesive layer. A distance between the first adhesive layer and the second adhesive layer may be greater than a distance between the first support part and the second support part.

In an embodiment, the lower member may further include a panel protection layer disposed under the display panel, a first adhesive layer bonding the panel protection layer and the first support part, and a second adhesive layer bonding the panel protection layer and the second support part and spaced apart from the first adhesive layer. A distance between the first adhesive layer and the second adhesive layer may be greater than a distance between the first support part and the second support part.

In an embodiment, the display device may include a flattened layer that may be disposed on an upper surface of the digitizer.

In an embodiment, the flattened layer may include at least one of an adhesive layer and a resin layer.

In an embodiment of the disclosure, a display device may include a display panel and a lower member disposed under the display panel. The display panel may include a first non-folding region, a second non-folding region, and a folding region disposed between the first non-folding region and the second non-folding region. The lower member may include a support layer and a digitizer. The support layer may include a first support part disposed below the first non-folding region, a second support part disposed below the second non-folding region, and a folding part disposed below the folding region, disposed between the first support part and the second support part, and having openings. The digitizer may include a first sensing region disposed below the first support part, and a second sensing region disposed below the second support part. The first support part and the second support part may include glass, glass fiber-reinforced plastic, or plastic, and the folding part may include metal.

BRIEF DESCRIPTION OF THE DRAWINGS

The accompanying drawings are included to provide a further understanding of the disclosure, and are incorporated in and constitute a part of this specification. The drawings illustrate some embodiments of the disclosure and, together with the description, serve to explain principles of the disclosure. In the drawings:

FIG. 5A is a schematic plan view of a digitizer according to an embodiment of the disclosure;

DETAILED DESCRIPTION OF THE EMBODIMENTS

In this description, it will be understood that when an element (or a region, a layer, portion, etc.) is referred to as being "on," "connected to" or "coupled to" another element or layer, it can be directly on, connected or coupled to the other element or a third intervening element may be present.

Like reference symbols refer to like elements. Also, in the figures, the thicknesses, the ratios, and the dimensions of elements may be exaggerated for effective illustration of technological contents. The term "and/or" includes all of one or more combinations that can be defined by associated elements.

Although the terms such as "first" and "second" may be used herein to describe various elements, these elements should not be limited by these terms. The terms are only used to distinguish one element from other elements. For example, without departing from the scope of the disclosure, a first component may be referred to as a second component, and similarly, the second component may also be referred to as the first component. Singular forms may include plural forms unless clearly defined otherwise in context.

Terms such as "below," "lower," "above," and "upper" may be used to describe the relationship between features illustrated in the figures. The terms have relative concepts and are described with respect to directions illustrated in the figures.

It should be further understood that the terms "include" or "have," when used in this specification, specify the presence of stated features, numbers, steps, operations, elements, components, or combinations thereof, but do not preclude the presence or addition of one or more other features, numbers, steps, operations, elements, components, and/or combinations thereof.

In the specification and the claims, the phrase "at least one of" is intended to include the meaning of "at least one selected from the group of" for the purpose of its meaning and interpretation. For example, "at least one of A and B" may be understood to mean "A, B, or A and B."

Unless otherwise defined or implied herein, all terms (including technical terms and scientific terms) used in this specification have the same meaning as that generally understood by those skilled in the art to which the disclosure pertains. It will be further understood that terms, such as those defined in commonly used dictionaries, should be interpreted as having a meaning that is consistent with their meaning in the context of the relevant art and the disclosure and should not be interpreted in an ideal or excessively formal sense unless clearly so defined herein.

Hereinafter, embodiments of the disclosure will be described with reference to the accompanying drawings.

Figure 1A:
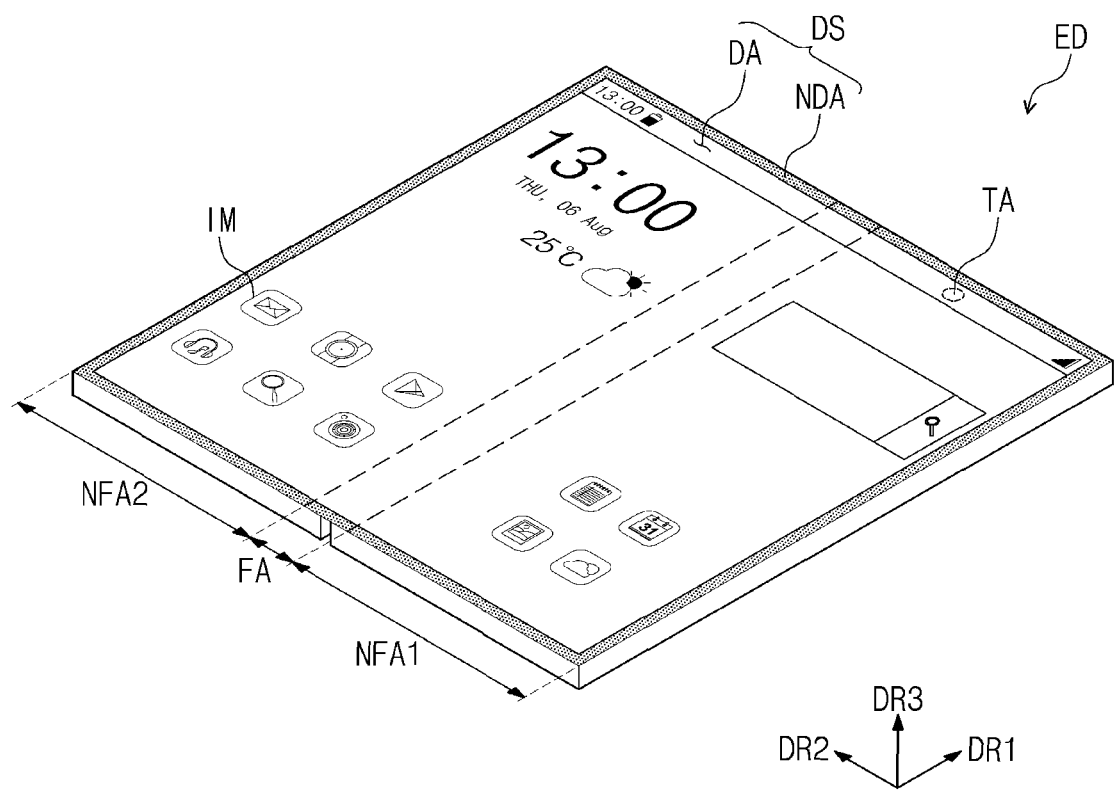
FIGS. 1A to 1C are schematic perspective views of a display device according to an embodiment of the disclosure.
Figure 1B:
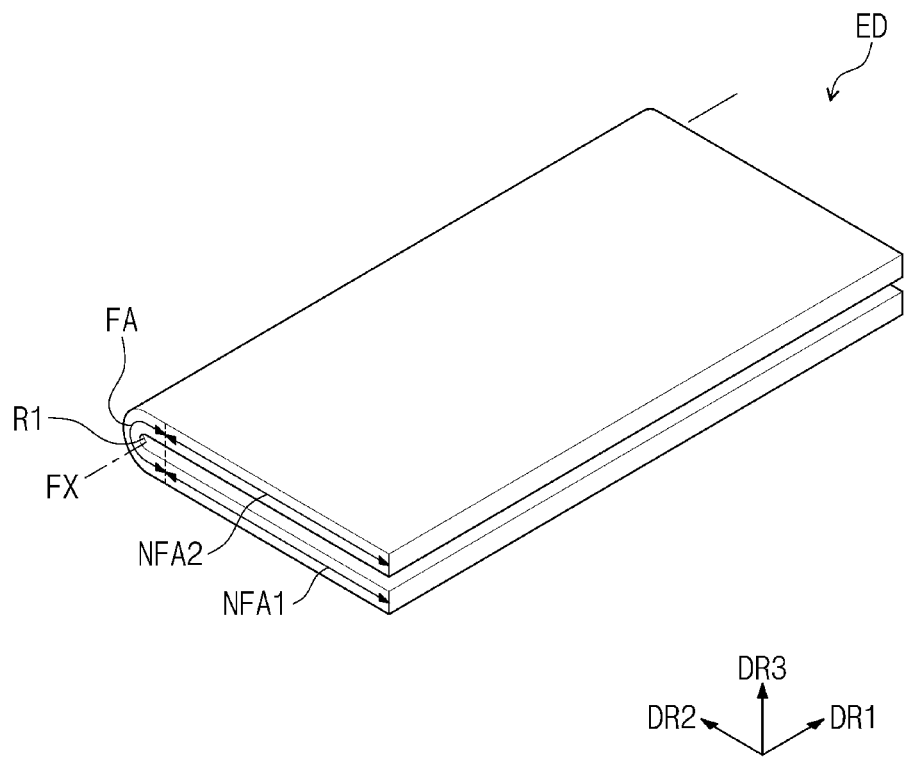
Figure 1C:
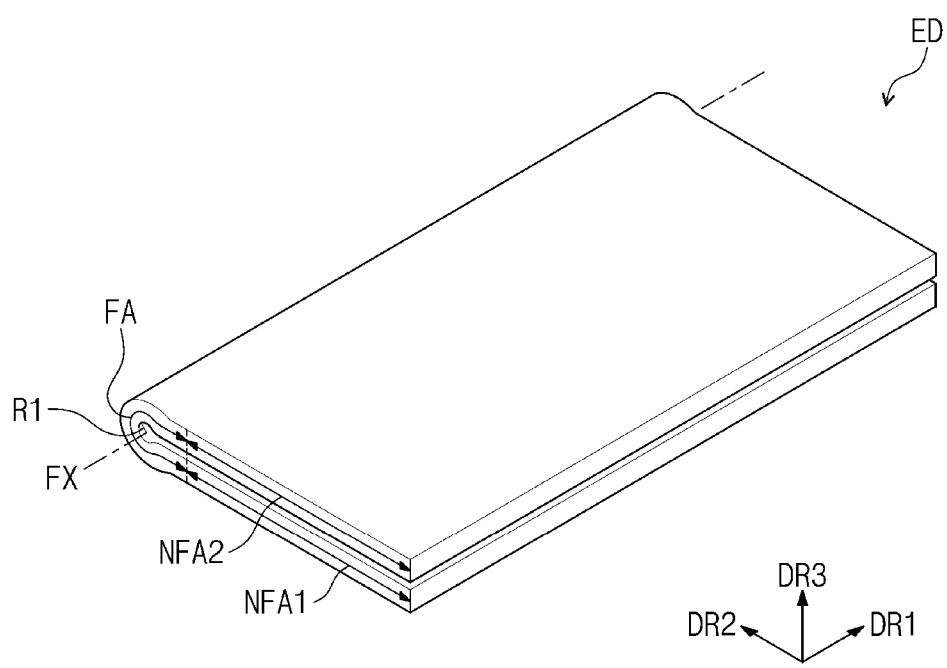

FIGS. 1A to 1C are schematic perspective views of an electronic device ED according to an embodiment. FIG. 1A illustrates an unfolded state and FIGS. 1B and 1C illustrate folded states.

Referring to FIGS. 1A to 1C, an electronic device ED according to an embodiment may include a display surface DS defined by a first direction DR1 and a second direction DR2 intersecting the first direction DR1. The electronic device ED may provide a user with an image IM through the display surface DS.

The display surface DS may include a display region DA and a non-display region NDA adjacent to the display region DA. The display region DA may display an image IM, and the non-display region NDA may not display an image IM. The non-display region NDA may surround the display region DA. However, the embodiments are not limited thereto, and the shapes of the display region DA and the non-display region NDA may be changed.

The display surface DS may further include a signal transmission region TA. The signal transmission region TA may be a region of the display region DA, or a region of the non-display region NDA. The signal transmission region TA has a higher transmittance than the display region DA and the non-display region NDA. Natural light, visible light, or infrared light may propagate through the signal transmission region TA. The electronic device ED may further include a sensor which captures an external image by using the visible light passing through the signal transmission region TA or determines whether an external object is approaching by using infrared light.

In an embodiment, the signal transmission region TA may not be spaced apart from the non-display region NDA and may extend from the non-display region NDA. Multiple signal transmission regions TA may be provided.

Hereinafter, a direction intersecting the plane defined by the first direction DR1 and the second direction DR2 may be defined as a third direction DR3. In this description, the term "on a plane" or "in a plan view" may be defined as a state of being viewed from above in the third direction DR3. Hereinafter, the first to third directions DR1, DR2 and DR3 may be directions respectively indicated by the first to third directional axes and be referred to by same reference symbols.

The electronic device ED may include a folding region FA and non-folding regions NFA1 and NFA2. The non-folding regions NFA1 and NFA2 may include a first non-folding region NFA1 and a second non-folding region NFA2. In the second direction DR2, the folding region FA may be disposed between the first non-folding region NFA1 and the second non-folding region NFA2.

As illustrated in FIG. 1B, the folding region FA may be folded with respect to a folding axis FX parallel to the first direction DR1. The folding region FA has a predetermined curvature and a radius R1 of curvature. The first non-folding region NFA1 and the second non-folding regions NFA2 may face each other, and the electronic device ED may be inwardly folded so that the display surface DS is not exposed to the outside.

In an embodiment, the electronic device ED may be outwardly folded or out-folded so that the display surface DS is exposed to the outside. In an embodiment, the electronic device ED may be configured so that in-folding or out-folding is alternately repeated from an unfolding operation, but the embodiments are not limited thereto. In an embodiment, the electronic device ED may be configured so that any one among an unfolding operation, an in-folding operation, or an out-folding operation may be selected.

As illustrated in FIG. 1B, the distance between the first non-folding region NFA1 and the second non-folding region NFA2 may be substantially equal to the radius R1 of curvature, but as illustrated in FIG. 1C, the distance between the first non-folding region NFA1 and the second non-folding region NFA2 may be smaller than the radius R1 of curvature. FIGS. 1B and 1C are illustrated with respect to the display surface DS, and a case EDC (see FIG. 2A) that forms the outer appearance of the electronic device ED may also come into contact with each other at end regions of the first non-folding region NFA1 and the second non-folding region NFA2.

Figure 2A:
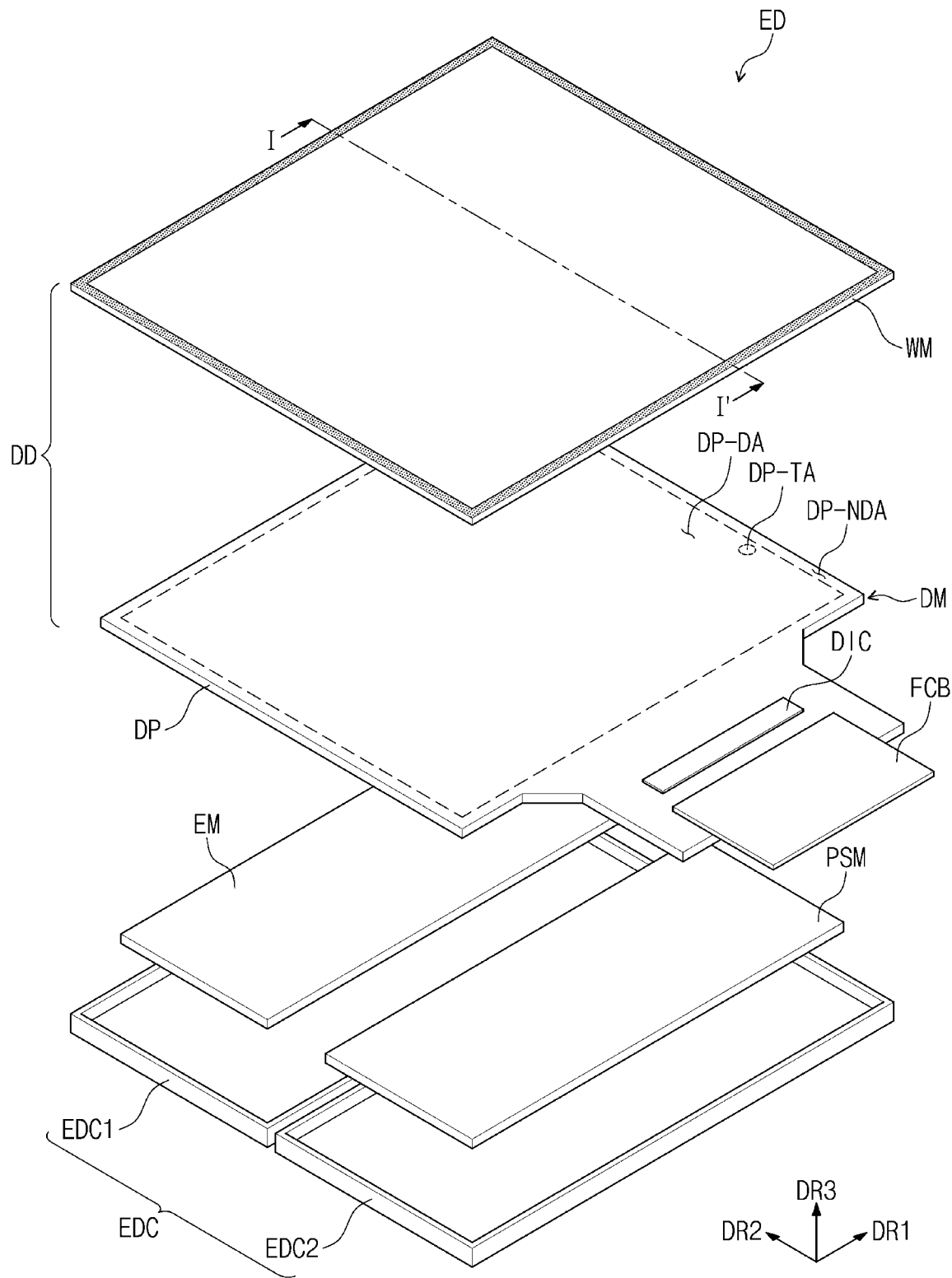
FIG. 2A is a schematic exploded perspective view illustrating a display device according to an embodiment of the disclosure.
Figure 2B:
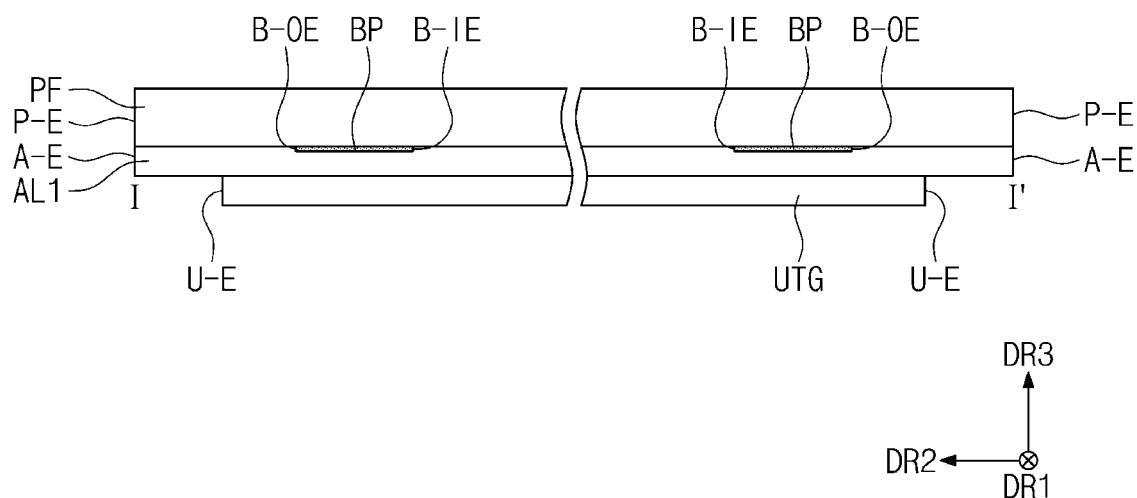
FIGS. 2B and 2C are schematic cross-sectional views of window modules according to an embodiment of the disclosure.
Figure 2C:
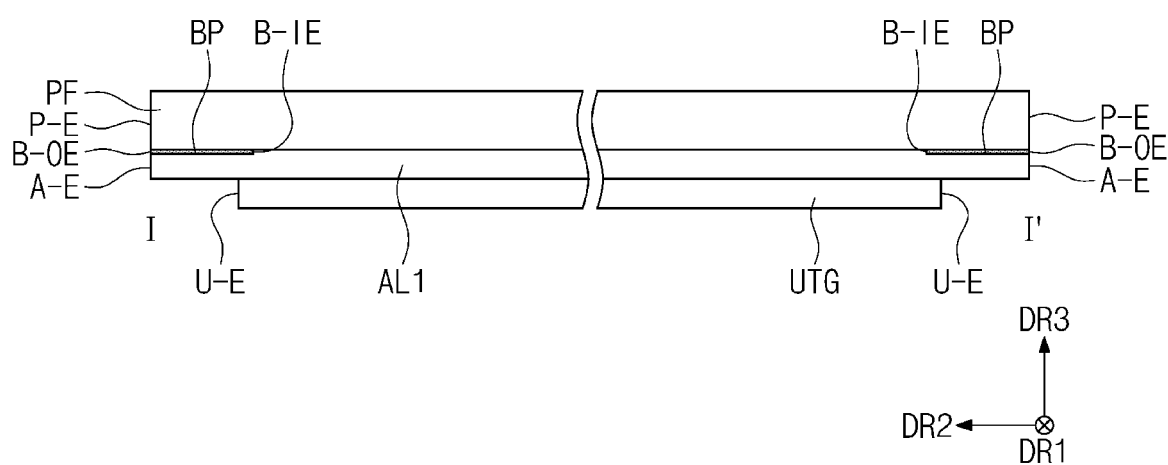
Figure 2D:
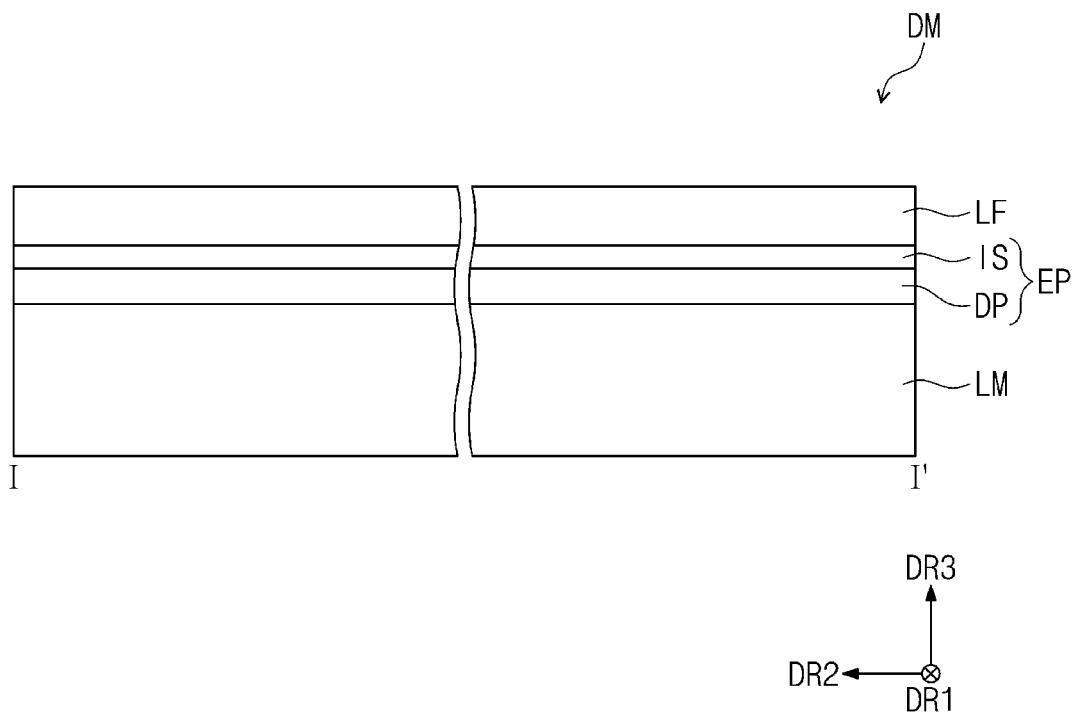
FIG. 2D is a schematic cross-sectional view of a display device according to an embodiment of the disclosure.

FIG. 2A is a schematic exploded perspective view of an electronic device ED according to an embodiment. FIGS. 2B and 2C are schematic cross-sectional views of window modules WM according to an embodiment. FIG. 2D is a schematic cross-sectional view of a display module DM according to an embodiment. FIGS. 2B to 2D each illustrate a cross-section corresponding to line I-I' of FIG. 2A.

As illustrated in FIG. 2A, the electronic device ED may include a display device DD, an electronic module EM, a power supply module PSM, and a case EDC. Although not shown separately in the drawings, the power supply module PSM may further include a mechanical structure for controlling the folding operation of the display device DD.

The display device DD may generate an image and detect an external input. The display device DD may include a window module WM and a display module DM. The window module WM may provide the front surface of the electronic device ED. The window module WM will be described below in detail.

The display module DM may include at least a display panel DP. FIG. 2A illustrates the display panel DP in a laminate or stacked structure of the display module DM, but the display module DM may further include elements disposed above and below the display panel DP. The laminate structure of the display module DM will be described below.

The display panel DP may include a display region DP-DA and a non-display region DP-NDA which respectively correspond to the display region DA (see FIG. 1A) and the non-display region NDA (see FIG. 1A) of an electronic device ED. In this description, if a region/portion "correspond to" another region/portion, the region/portion overlaps another region/portion and is not limited to a same area. The display module DM may include a drive chip DIC disposed on the non-display region DP-NDA. The display module DM may further include a flexible circuit film FCB connected to the non-display region DP-NDA. Although not shown in the drawings, the flexible circuit film FCB may be connected to a main circuit board.

The display panel DP may further include a signal transmission region DP-TA. The signal transmission region DP-TA may be an opening or a region having a lower resolution than the display region DP-DA. Therefore, the signal transmission region DP-TA may have higher transmittance than the display region DP-DA and the non-display region DP-NDA.

The drive chip DIC may include drive elements for driving pixels of the display panel DP, for example, a data drive circuit. FIG. 2A illustrates a structure in which the drive chip DIC is mounted on the display panel DP, but the embodiment is not limited thereto. For example, the drive chip DIC may be mounted on a flexible circuit film FCB.

The electronic module EM may include a main controller. The electronic module EM may include a wireless communication module, a camera module, a proximity sensor module, an image input module, an audio input module, an audio output module, a memory, an external interface module, or the like. The modules may be mounted on the circuit board, or be electrically connected via a flexible circuit board. The electronic module EM may be electrically connected to the power supply module PSM.

The main controller may control overall operations of the electronic device ED. For example, the main controller may activate the display device DD in response to a user input or deactivate the display device. The main controller may control the operations of the display device DD and other modules. The main controller may include at least one microprocessor.

The case EDC may accommodate the display module DM, the electronic module EM, and the power supply module PSM. FIG. 2A illustrates case EDC as including separate two cases EDC1 and EDC2, but the embodiments are not limited thereto. Although not shown, the electronic device ED may further include a hinge structure for connecting the two cases EDC1 and EDC2. The case EDC may be connected to the window module WM. The case EDC may protect the elements, such as the display module DM, the electronic module EM, and the power supply module PSM, accommodated in the case EDC.

Referring to FIGS. 2B and 2C, the window module WM may include a thin film glass substrate UTG, a window protection layer PF disposed on the thin film glass substrate UTG, and a bezel pattern BP disposed on the lower surface of the window protection layer PF. In this embodiment, the window protection layer PF may include a plastic film. Accordingly, the window module WM may further include a first adhesive layer AL1 for connecting the plastic film PF and the thin film glass substrate UTG. Hereinafter, unless separately specified, the window protection layer PF may be described as a plastic film and denoted by a same reference symbol.

The bezel pattern BP may overlap the non-display region DP-NDA illustrated in FIG. 2A. The bezel pattern BP may be disposed on a surface of the thin film glass substrate UTG or a surface of the plastic film PF. As an example, FIG. 2B illustrates the bezel pattern BP disposed on the lower surface of the plastic film PF. The embodiments are not limited thereto, and the bezel pattern BP may also be disposed on the upper surface of the plastic film PF. The bezel pattern BP may be a colored light shielding film and formed by, for example, a coating method. The bezel pattern BP may include a base material and a dye, or a pigment mixed in the base material.

In a plan view, an outer region of an inner edge B-IE of the bezel pattern BP may correspond to the non-display region NDA illustrated in FIG. 1A. The bezel pattern BP may have a closed line shape in a plan view. An inner region of the inner edge B-IE of the bezel pattern BP may correspond to the display region DA illustrated in FIG. 1A.

The thickness of the thin film glass substrate UTG may be about 15 μm to about 45 μm. The thin film glass substrate UTG may be a chemically reinforced glass. The thin film glass substrate UTG may minimize occurrence of wrinkles even in case that folding and unfolding are repeated.

The thickness of the plastic film PF may be about 50 μm to about 80 μm. The plastic film PF may include polyimide, polycarbonate, polyamide, triacetylcellulose, polymethylmethacrylate, or polyethylene terephthalate. Although not shown in the drawings, at least any one among a hard coating layer, a fingerprint prevention layer, or a reflection prevention layer may be disposed on the upper surface of the plastic film PF.

The first adhesive layer AL1 may be a pressure sensitive adhesive (PSA) film or an optically clear adhesive (OCA). Adhesive layers to be described below may be the same as the first adhesive layer AL1 and include a general adhesive.

The first adhesive layer AL1 may be separated from the thin film glass substrate UTG. Since the strength of the thin film glass substrate UTG is lower than that of the plastic film PF, scratches may be relatively easily caused. After the first adhesive layer AL1 and the plastic film PF are separated from each other, a new plastic film PF may be attached to the thin film glass substrate UTG.

In a plan view, an edge U-E of the thin film glass substrate UTG may overlap the bezel pattern BP. As the above-described conditions are satisfied, the edge U-E of the thin film glass substrate UTG is exposed from the bezel pattern BP, and fine cracks caused on the edge U-E of the thin film glass substrate UTG may be inspected by an inspection device.

In a plan view, the edge U-E of the thin film glass substrate UTG may be disposed between an edge P-E of the plastic film PF and an outer edge B-OE of the bezel pattern BP. The edge U-E of the thin film glass substrate UTG may sufficiently be exposed from the bezel pattern BP.

In a plan view, an edge P-E of the plastic film PF and an edge A-E of the first adhesive layer AL1 may be aligned with each other. The plastic film PF and the first adhesive layer AL1 may have a same area and a same shape.

As illustrated in FIG. 2C, in a plan view, the outer edge B-OE of the bezel pattern BP may be aligned to an edge P-E of the plastic film PF. The thin film glass substrate UTG and the plastic film PF may have substantially a same shape and area.

Although not separately shown, the window protection layer PF may include a plastic resin layer directly disposed on the upper surface of the thin film glass substrate UTG. The plastic resin layer contacting the upper surface of the thin film glass substrate UTG may be formed by using an insert molding method. Before the plastic resin layer is formed, the bezel pattern BP may be formed on the upper surface of the thin film glass substrate UTG. Accordingly, the plastic resin layer may cover or overlap the bezel pattern BP.

Referring to FIG. 2D, the display module DM may include a display panel DP, an input sensor IS disposed on the display panel DP, an optical film LF disposed on the input sensor IS, and a lower member LM disposed under the display panel DP. An adhesive layer may be disposed between the display panel DP, the input sensor IS, the optical film LF, and the lower member LM as desired.

The display panel DP may include a base layer, a circuit element layer disposed on the base layer, a display element layer disposed on the circuit element layer, and a thin film sealing layer disposed on the display element layer. The base layer may include a plastic film. For example, the base layer may include polyimide. The planar shape of the base layer may be substantially identical to that of the display panel DP illustrated in FIG. 3A described below.

The circuit element layer may include an organic layer, an inorganic layer, a semiconductor pattern, a conductive pattern, a signal line, or the like. An organic layer, an inorganic layer, a semiconductor layer, and a conductive layer may be formed on the base layer by a method such as coating or deposition. Subsequently, the semiconductor pattern, the conductive pattern, and the signal line may be formed by selectively patterning the organic layer, the inorganic layer, the semiconductor layer, and the conductive layer by one or more photolithography process.

The semiconductor pattern, the conductive pattern, and the signal line may form a pixel drive circuit and signal lines SL1-SLm, DL1-DLn, EL1-ELm, CSL1, CSL2 and PL of the pixels PX illustrated in FIG. 3A to be described below. The pixel drive circuit may include at least one transistor.

The display element layer may include the light-emitting elements of the pixels PX illustrated in FIG. 3A to be described below. The light-emitting element may be electrically connected to at least one transistor. The thin film sealing layer may be disposed on the circuit element layer so as to seal or overlap the display element layer. The thin-film sealing layer may include an inorganic layer, an organic layer, and an inorganic layer which are sequentially laminated (or stacked). The laminate structure of the thin film sealing layer is not particularly limited.

The input sensor IS may include sensing electrodes (not shown) for sensing an external input, trace lines (not shown) electrically connected to the sensing electrodes, and an inorganic layer and/or an organic layer for insulating/protecting the sensing electrodes or the trace lines. The input sensor IS may be an electrostatic capacitive sensor, but the embodiment is not particularly limited.

The input sensor IS may be formed directly on the thin film sealing layer by a continuous process when the display panel DP is manufactured. In this description, the input sensor IS-integrated display panel DP may be defined as an electronic panel EP. However, the embodiment is not limited thereto, and the input sensor IS may be manufactured as a separate panel from the display panel DP and be attached to the display panel DP by an adhesive layer.

Figure 3A:
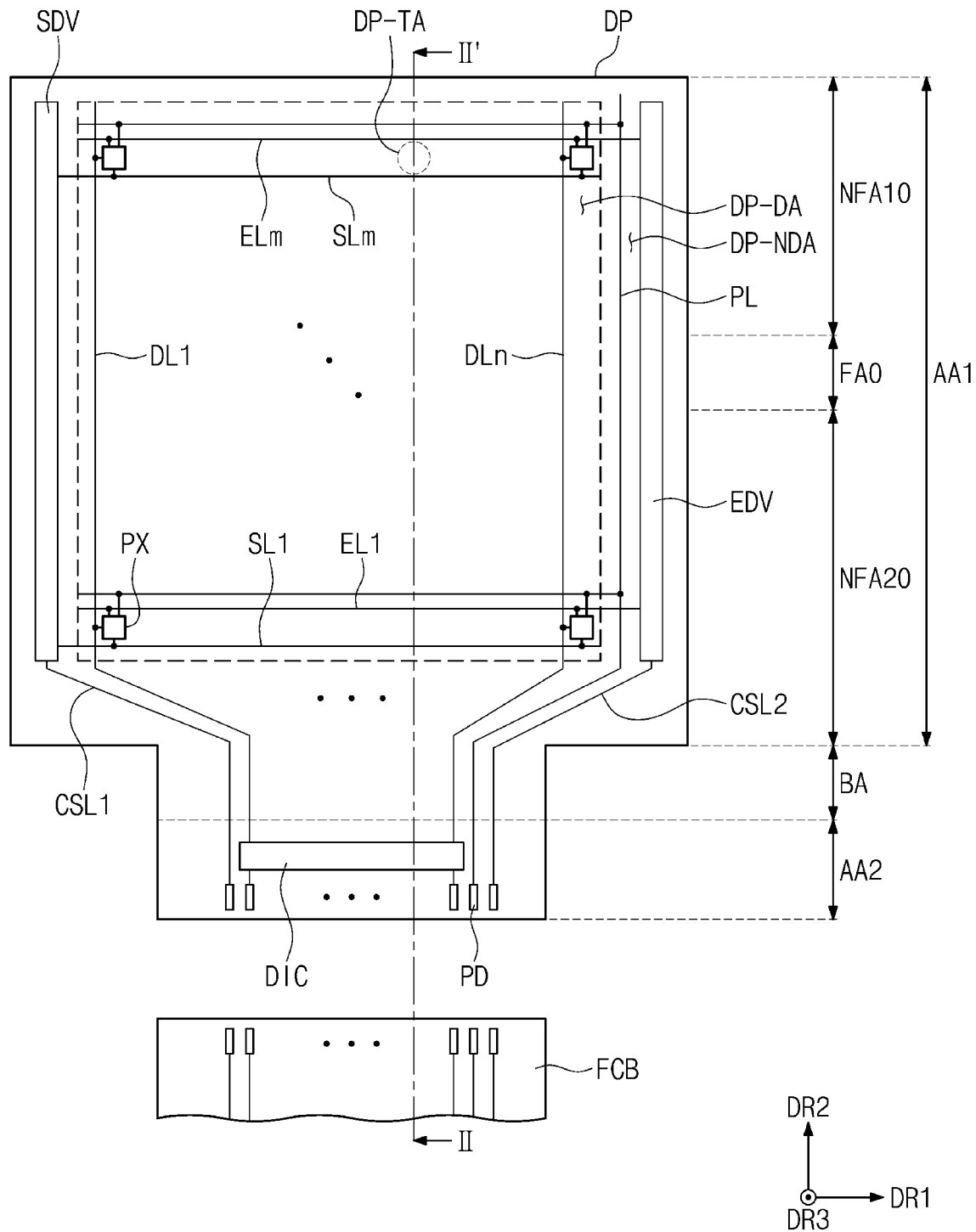
FIG. 3A is a schematic plan view of a display panel according to an embodiment of the disclosure.

The sensing electrodes may overlap the display region DP-DA (see FIG. 3A). The trace lines are disposed so as to overlap the non-display region DP-NDA. The trace lines may extend toward the lower end of a second region AA2 via a bending region BA (see FIG. 3A) so as to be adjacent to a pad PD illustrated in FIG. 3A. The trace lines may be disposed on a layer different from that of the signal lines SL1-SLm, DL1-DLn, EL1-ELm, CSL1, CSL2 and PL of the circuit element layer.

The trace lines may be electrically connected to the signal lines (input signal lines) provided for the input sensor IS of the display panel DP in a first region AA1 illustrated in FIG. 3A. The input signal lines may be signal lines different from the signal lines SL1-SLm, DL1-DLn, EL1-ELm, CSL1, CSL2 and PL illustrated in FIG. 3A, but the input signal lines and any one of the signal lines may be disposed on a same layer. The input signal lines may each be electrically connected to a corresponding pad PD. Therefore, the trace lines and the signal lines of the circuit element layer may be electrically connected to a same flexible circuit film FCB.

The optical film LF may lower the reflectivity of external light. The optical film LF may include a retarder and/or a polarizer. The optical film LF may include at least a polarization film.

The lower member LM may include various functional members. The lower member LM may include a light blocking layer for blocking light incident on the display panel DP, a shock absorbing layer for absorbing an external shock, a support layer for supporting the display panel DP, a heat dissipation layer for dissipating heat generated by the display panel DP, or the like. The stacked structure of the lower member LM is not particularly limited.

Figure 3B:
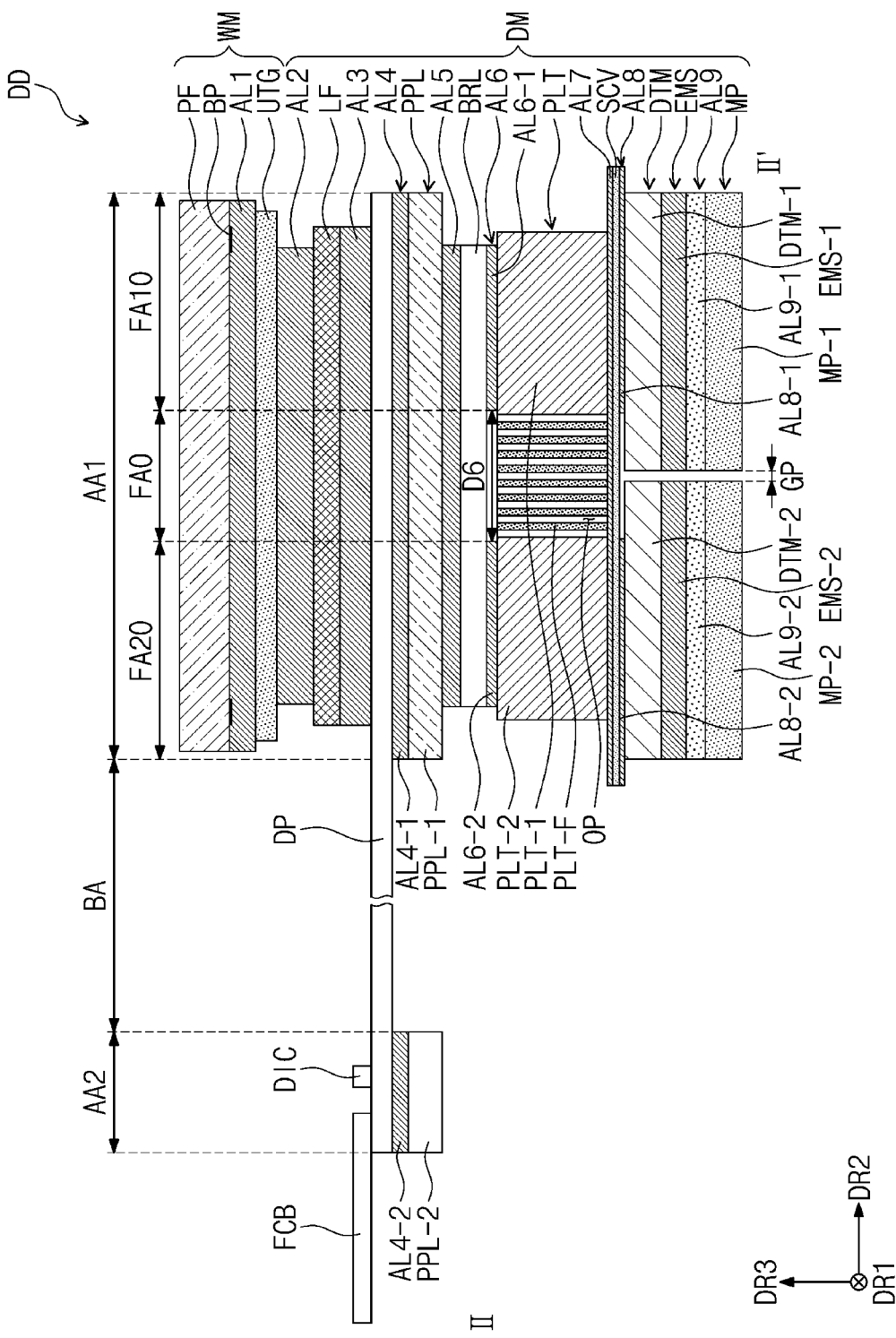
FIG. 3B is a schematic cross-sectional view of a display device according to an embodiment of the disclosure.
Figure 3C:
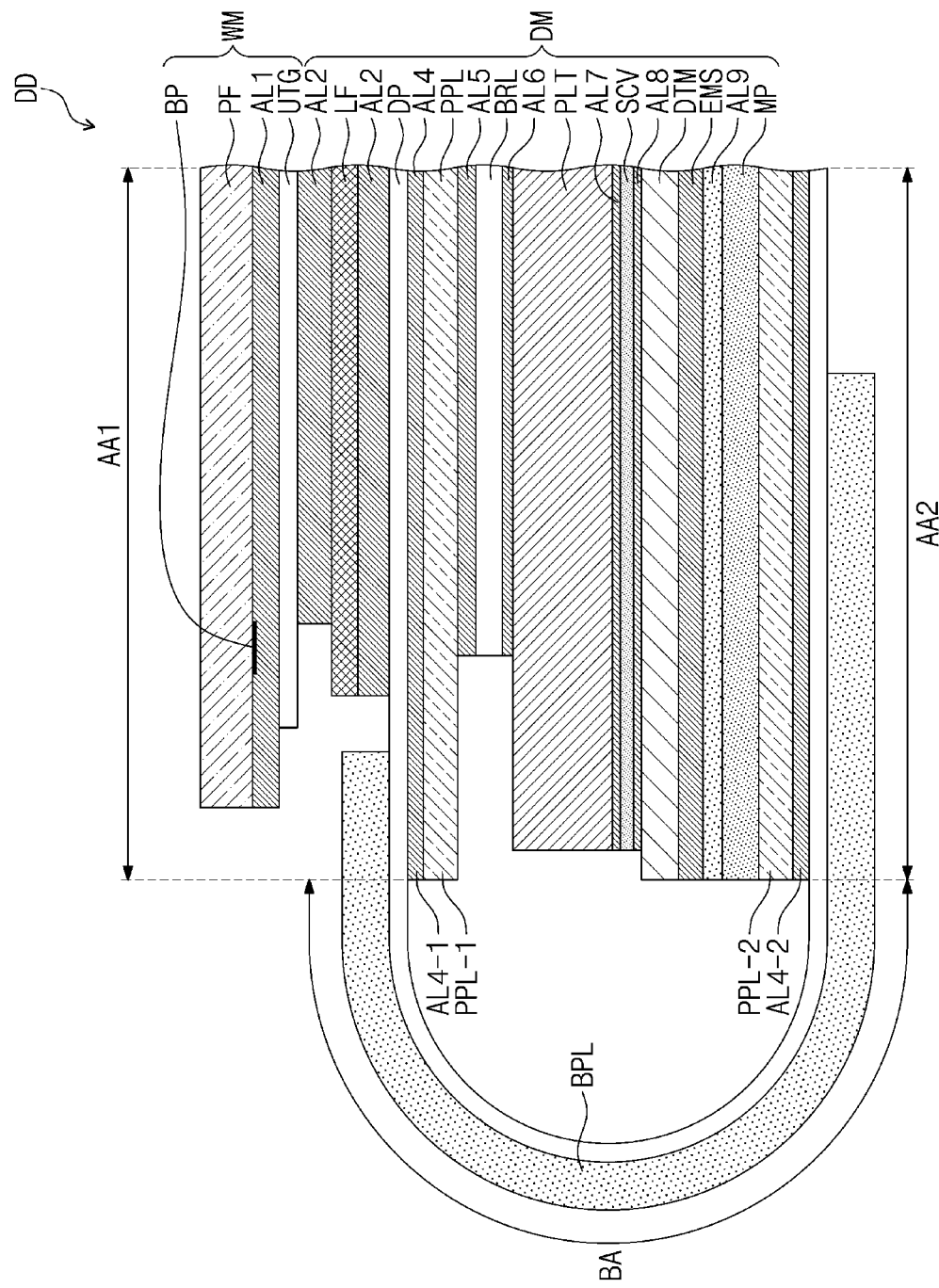
FIG. 3C is a schematic cross-sectional view of a display device according to an embodiment of the disclosure.

FIG. 3A is a schematic plan view of a display panel DP according to an embodiment. FIG. 3B is a schematic cross-sectional view of a display device DD according to an embodiment. FIG. 3C is a schematic cross-sectional view of a display device DD according to an embodiment. FIG. 3B illustrates a schematic cross-section corresponding to line II-II' of FIG. 3A. FIG. 3C illustrates a portion of a cross-section of the bending region BA in a bent state.

Referring to FIG. 3A, the display panel DP may include a display region DP-DA and a non-display region DP-NDA in the vicinity of the display region DP-DA. The display region DP-DA and the non-display region DP-NDA may be classified according to whether pixels PX are disposed therein. The pixels PX may be disposed in the display region DP-DA. A scan drive part SDV, a data drive part, and an emission drive part EDV may be disposed in the non-display region DP-NDA. The data drive part may be one or more circuits configured in the drive chip DIC illustrated in FIG. 3A.

In this embodiment, the signal transmission region DP-TA may be a region having a lower resolution than the display region DP-DA. In case that four pixels are disposed per unit area in the display region DP-DA, two pixels may be disposed per unit area in the signal transmission region DP-TA. A light signal may propagate through a region which is in the signal transmission region DP-TA and in which the pixels are not disposed.

The display panel DP may include a first region AA1, a second region AA2, and a bending region BA which are divided in the second direction DR2. The second region AA2 and the bending region BA may be some regions of the non-display region DP-NDA. The bending region BA may be disposed between the first region AA1 and the second region AA2.

FIG. 3B illustrates a state in which the display panel DP is unfolded before being bent. In case that the display panel DP is installed in the electronic device ED, the first region AA1 and the second region AA2 of the display panel DP may be disposed on different planes in a state in which the electronic device ED is unfolded. This is illustrated in FIG. 3C. The bent shape of the bending region BA will be described with reference to FIG. 3C.

Referring again to FIG. 3A, the first region AA1 may be a region corresponding to the display surface DS of FIG. 1A. The first region AA1 may include a first non-folding region NFA10, a second non-folding region NFA20, and a folding region FA0. The first non-folding region NFA10, the second non-folding region NFA20, and the folding region FA0 may respectively correspond to the first non-folding region NFA1, the second non-folding region NFA2, and the folding region FA of FIGS. 1A to 1C.

In the first direction DR1, the lengths of the bending region BA and the second region AA2 may be smaller than that of the first region AA1. The smaller the length of a region in the bending axis direction is, the easier the region may be bent.

The display panel DP may include pixels PX, scan lines SL1-SLm, data lines DL1-DLn, emission lines EL1-Elm, first and second control lines CSL1 and CSL2, a power line PL, and pads PD. Here, m and n are natural numbers. The pixels PX may be electrically connected to the scan lines SL1-SLm, the data lines DL1-DLn, and the emission lines EL1-Elm.

The scan lines SL1-SLm may extend in the second direction DR2 and be electrically connected to the scan drive part SDV. The data lines DL1-DLn may extend in the second direction DR2 and be electrically connected to the drive chip DIC via the bending region BA. The emission lines EL1-ELm may extend in the first direction DR1 and be electrically connected to the emission drive part EDV.

The power line PL may include a portion extending in the second direction DR2 and a portion extending in the first direction DR1. The portion extending in the first direction DR1 and the portion extending in the second direction DR2 may be disposed on different layers. The portion extending in the second direction DR2 in the power line PL may extend to the second region AA2 via the bending region BA. The power line PL may provide a first voltage to the pixels PX.

The first control line CSL1 may be electrically connected to the scan drive part SDV and extend toward the lower end of the second region AA2 via the bending region BA. The second control line CSL2 may be electrically connected to the emission drive part EDV and extend toward the lower end of the second region AA2 via the bending region BA.

In a plan view, the pads PD may be disposed adjacent to the lower end of the second region AA2. The drive chip DIC, the power line PL, the first control line CSL1, and the second control line CSL2 may be electrically connected to the pads PD. The flexible circuit film FCB may be electrically connected to the pads PD through an anisotropic conductive adhesive layer.

Referring to FIGS. 3B and 3C, the display device DD may include a window module WM and a display module DM. The window module WM may be any one among the window modules WM described above with reference to FIGS. 2A to 2C, and the embodiments are not limited thereto.

The display module DM may include an optical film LF, a display panel DP, a panel protection layer PPL, a barrier layer BRL, a support layer PLT, a cover layer SCV, a digitizer DTM, an electromagnetic shield layer EMS, a metal plate MP, and second to ninth adhesive layers AL2-AL9. The second to ninth adhesive layers AL2-AL9 may include a pressure sensitive adhesive or an optically clear adhesive. In an embodiment, a portion of the above-described elements may be omitted. For example, the metal plate MP and the ninth adhesive layer AL9 associated therewith may be omitted.

The optical film LF may be disposed in the first region AA1 illustrated in FIG. 3A. The optical film LF may cover or overlap at least a display region DP-DA. The second adhesive layer AL2 may connect the optical film LF and the window module WM, and the third adhesive layer AL3 may connect the optical film LF and the display panel DP. Although the display panel DP is illustrated in FIG. 3B, an input sensor IS may further be disposed between the display panel DP and the third adhesive layer AL3 similar to the electronic panel EP illustrated in FIG. 2D.

The panel protection layer PPL may be disposed under the display panel DP. The panel protection layer PPL may protect a lower portion of the display panel DP. The panel protection layer PPL may include a flexible plastic material. For example, the panel protection layer PPL may include polyethylene terephthalate. In an embodiment, the panel protection layer PPL may not be disposed in a folding region FA. The panel protection layer PPL may include a first panel protection layer PPL-1 for protecting the first region AA1 of the display panel DP and a second panel protection layer PPL-2 for protecting the second region AA2.

The fourth adhesive layer AL4 may bond the panel protection layer PPL to the display panel DP. The fourth adhesive layer AL4 may include a first portion AL4-1 corresponding to the first panel protection layer PPL-1 and a second portion AL4-2 corresponding to the second panel protection layer PPL-2.

As illustrated in FIG. 3C, in case that the bending region BA is bent, the second panel protection layer PPL-2 may be disposed under the first region AA1 and the first panel protection layer PPL-1 together with the second region AA2. Since the panel protection layer PPL is not disposed in the bending region BA, the bending region BA may be more readily bent.

The bending region BA may have a curvature and a radius of curvature. The radius of curvature may be about 0.1-0.5 mm. A bending protection layer BPL may be disposed at least in the bending region BA. The bending protection layer BPL may overlap the bending region BA, the first region AA1, and the second region AA2. The bending protection layer BPL may be disposed on a portion of the first region AA1 and on a portion of the second region AA2.

The bending protection layer BPL may be bent together with the bending region BA. The bending protection layer BPL may protect the bending region BA from an external shock and may control the neutral surface of the bending region BA. The bending protection layer BPL may control the stress in the bending region BA so that the neutral surface is close to the signal lines CSL1 and CSL2 disposed in the bending region BA.

As illustrated in FIGS. 3B and 3C, the fifth adhesive layer AL5 may bond the panel protection layer PPL to the barrier layer BRL. The barrier layer BRL may be disposed under the panel protection layer PPL. The barrier layer BRL may enhance the resistance against compressive force caused by external pressing. Therefore, the barrier layer BRL may function to prevent deformation of the display panel DP. The barrier layer BRL may include a flexible plastic material such as polyimide or polyethylene terephthalate. The barrier layer BRL may be a colored film having low light transmittance. The barrier layer BRL may absorb light incident from the outside. For example, the barrier layer BRL may be a black plastic film. In case that the display device DD is viewed from over the window protection layer FP, the elements disposed under the barrier layer BRL may not be visually recognized by a user.

The sixth adhesive layer AL6 may bond the barrier layer BRL to the support layer PLT. The sixth adhesive layer AL6 may include a first portion AL6-1 and a second portion AL6-2 which are spaced apart from each other. The distance D6 (or interval) between the first portion AL6-1 and the second portion AL6-2 may correspond to the width of the folding region FA0 and is greater than a gap GP to be described below. The distance D6 between the first portion AL6-1 and the second portion AL6-2 may be about 7-15 mm and may also be about 9-13 mm.

In this embodiment, the first portion AL6-1 and the second portion AL6-2 may be defined as different portions of an adhesive layer, but the embodiment is not limited thereto. In case that the first portion AL6-1 is defined as a single adhesive layer (for example, a first adhesive layer), the second portion AL6-2 may be defined as another adhesive layer (for example, a second adhesive layer).

The support layer PLT may be disposed under the barrier layer BRL. The support layer PLT may support the elements disposed above the support layer and may maintain the unfolded and folded states of the display device DD. The support layer PLT may include a first support part PLT-1 that corresponds to at least the first non-folding region NFA10 and has insulating property; and a second support part PLT-2 that corresponds to the second non-folding region NFA20 and has insulating property. The first support part PLT-1 and the second support part PLT-2 may be spaced apart from each other in the second direction DR2.

As in this embodiment, the support layer PLT may correspond to the folding region FA0, be disposed between the first support part PLT-1 and the second support part PLT-2, and further include a folding part PLT-F in which openings OP are defined. The folding part PLT-F may prevent permeation of foreign substances into a region of the barrier layer BRL opened from the first support part PLT-1 and the second support part PLT-2 during the folding operation illustrated in FIGS. 2B and 2C. In an embodiment, the folding part PLT-F may be omitted.

The folding part PLT-F may have a greater elastic modulus than the first support part PLT-1 and the second support part PLT-2. The folding part PLT-F may include a material having an elastic modulus of not less than about 60 GPa, and a metallic material such as stainless steel. For example, the folding part PLT-F may include SUS304, but the embodiment is not limited thereto, and the folding part PLT-F may include various metallic materials.

The first support part PLT-1 and the second support part PLT-2 may be formed of a material selected from materials that is capable of passing a magnetic field generated by the digitizer DTM to be described below without loss or with minimum loss. The first support part PLT-1 and the second support part PLT-2 may include a non-metallic material. The first support part PLT-1 and the second support part PLT-2 may include plastic, glass fiber reinforced plastic, or glass. The plastic may include polyimide or polyethylene terephthalate and is not limited to a particular material. The first support part PLT-1 and the second support part PLT-2 may include a same material.

Openings OP may be defined in regions of the support layer PLT corresponding to the folding region FA0. The flexibility of the support layer PLT may be improved by the openings OP. The flexibility of the support layer PLT may be improved by not disposing the sixth adhesive layer AL6 in a region corresponding to the folding region FA0.

The seventh adhesive layer AL7 may bond the support layer PLT to the cover layer SCV, and the eighth adhesive layer AL8 may bond the cover layer SCV to the digitizer DTM. The cover layer SCV may cover the openings OP defined in the support layer PLT. The cover layer SCV may have a lower elastic modulus than the support layer PLT. For example, the cover layer SCV may include thermoplastic polyurethane, rubber, and silicone, but the embodiment is not limited thereto.

The cover layer SCV may be manufactured in a sheet shape and be attached to the support layer PLT. The eighth adhesive layer AL8 may include a first portion AL8-1 and a second portion AL8-2 which are spaced apart from each other. The distance between the first portion AL8-1 and the second portion AL8-2 may correspond to the width of the folding region FA0 and may be greater than a gap GP to be described below. The flexibility of the cover layer SCV may be improved by not disposing the eighth adhesive layer AL8 in a region corresponding to the folding region FA0. The distance between the first portion AL8-1 and the second portion AL8-2 of the eighth adhesive layer AL8 may correspond to the distance D6 between the first portion AL6-1 and the second portion AL6-2 of the sixth adhesive layer AL6.

The digitizer DTM may also be referred to as an electromagnetic radiation (EMR) sensing panel and may include loop coils for generating a magnetic field having a resonance frequency preset with respect to an electronic pen. The magnetic field generated by the loop coils may be applied to an LC resonance circuit composed of an inductor (a coil) and a capacitor of the electronic pen. The coils may generate current from the received magnetic field and deliver the generated current to the capacitor. Therefore, the capacitor may be charged from the current input from the coils and may discharge the charged current to the coils. Therefore, a magnetic field having the resonance frequency may be generated from the coils. The magnetic field discharged by the electronic pen may be absorbed again by the loop coils of the digitizer, and thus, it is possible to determine whether the electronic pen approaches a location on a touch screen.

The digitizer DTM may include a first digitizer DTM-1 attached to a first portion AL8-1 of the eighth adhesive layer AL8 and a second digitizer DTM-2 attached to the second portion AL8-2 of the eighth adhesive layer ALB. The first digitizer DTM-1 and the second digitizer DTM-2 may be disposed spaced apart from each other with a gap GP therebetween. The gap GP may be about 0.3-3 mm and correspond to the folding region FA0. The digitizer DTM will be described below in detail.

The electromagnetic shield layer EMS may be disposed under the digitizer DTM. In order to block the influence of the electromagnetic wave, generated by the electronic module EM illustrated in FIG. 2A, on the digitizer as noise, the electromagnetic shield layer EMS may be added. The electromagnetic shield layer EMS may include a first electromagnetic shield layer EMS-1 and a second electromagnetic shield layer EMS-2 which respectively correspond to the first digitizer DTM-1 and the second digitizer DTM-2. The electromagnetic shield layer EMS may include magnetic metal powder (MMP). The magnetic metal powder (MMP) may be directly formed on the lower surface of the digitizer DTM by coating and curing processes. In an embodiment, the electromagnetic shield layer EMS may be omitted.

The ninth adhesive layer AL9 may bond the electromagnetic shield layer EMS to the metal plate MP. The ninth adhesive layer AL9 may include a first portion AL9-1 and a second portion AL9-2 which are spaced apart from each other. The metal plate MP may include a first metal plate MP-1 and a second metal plate MP-2 which are respectively attached to the first portion AL9-1 and the second portion AL9-2. The metal plate MP may improve heat dissipation and protect the elements disposed above the metal plate MP in case that the second panel protection layer PPL-2 is bent and fixed as illustrated in FIG. 3C. FIG. 3C does not illustrate an adhesive layer between the metal plate MP and the second panel protection layer PPL-2.

Figure 4A:
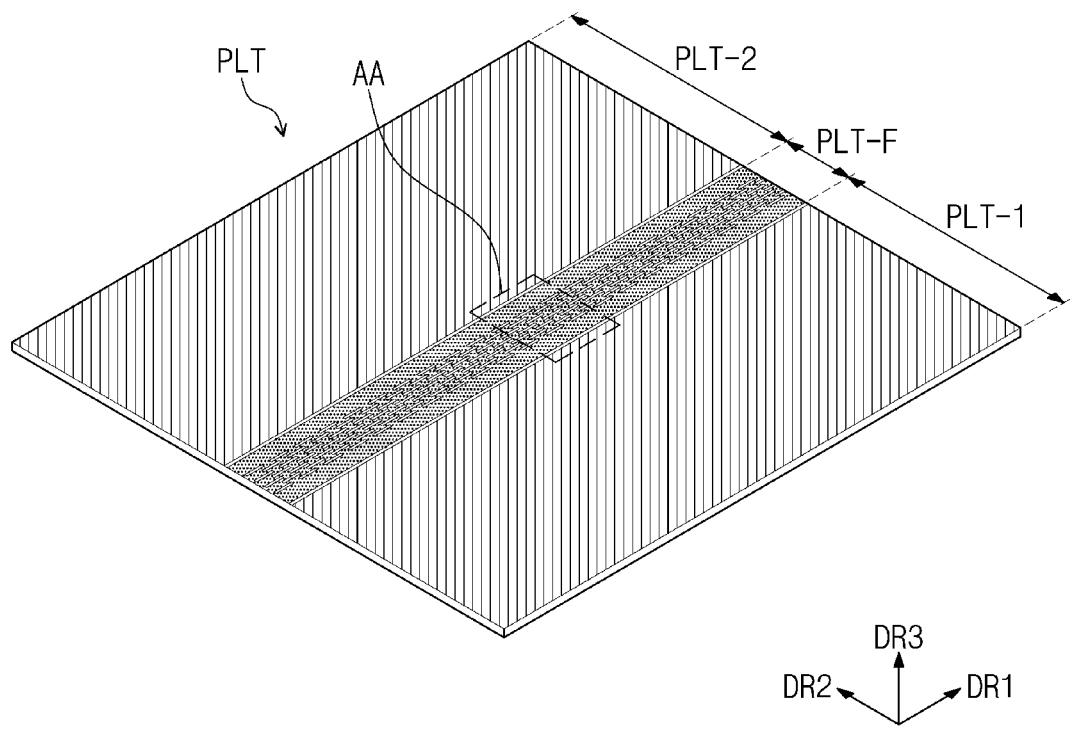
FIG. 4A is a schematic plan view of a support layer according to an embodiment of the disclosure.
Figure 4B:
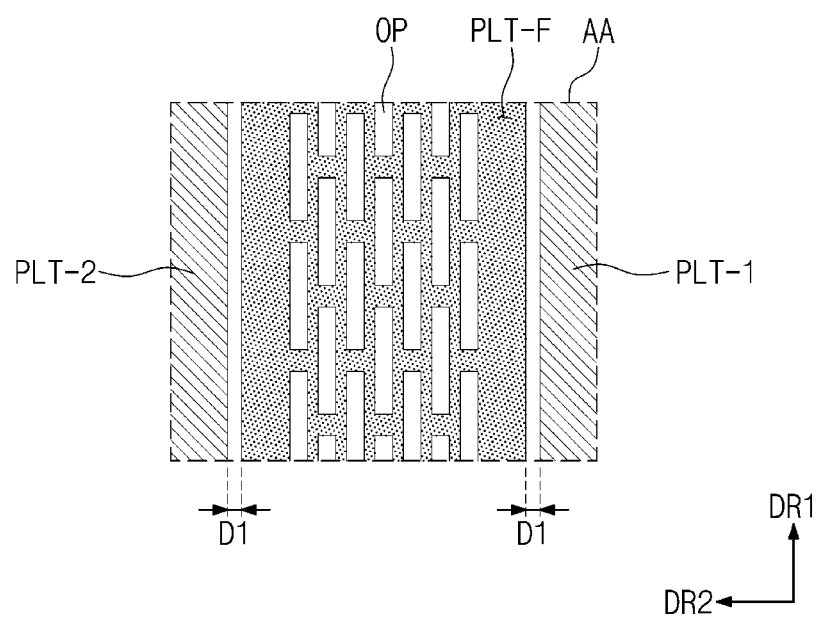
FIG. 4B is a schematic partial plan view of a support layer according to an embodiment of the disclosure.
Figure 4C:
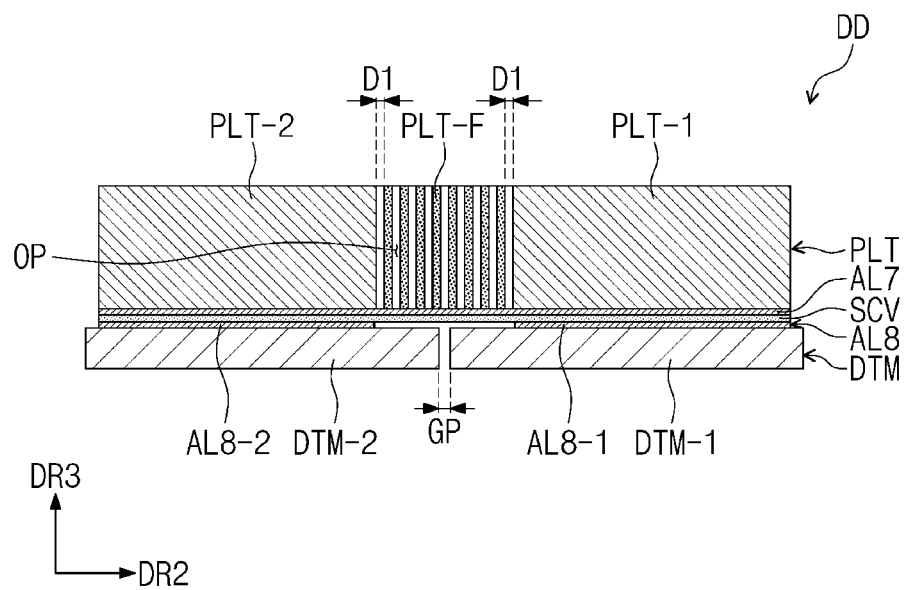
FIG. 4C is a schematic partial cross-sectional view of a display device according to an embodiment of the disclosure.
Figure 4D:
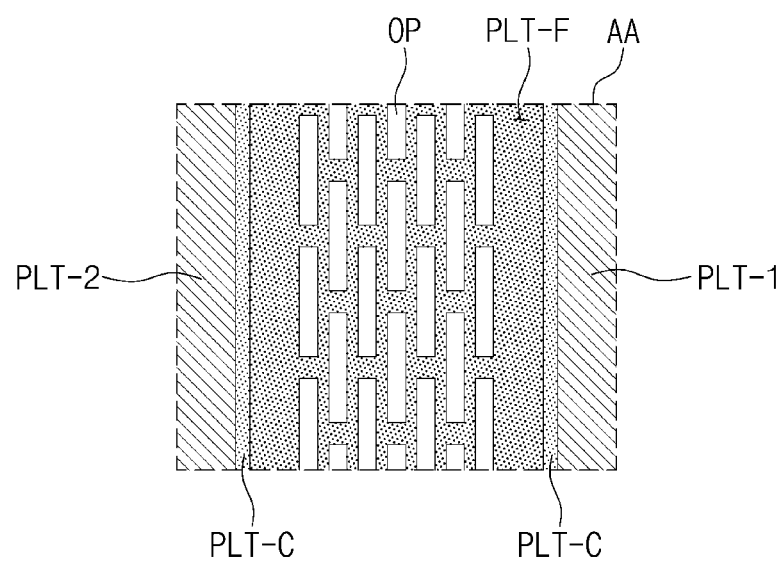
FIG. 4D is a schematic partial plan view of a support layer according to an embodiment of the disclosure.
Figure 4E:
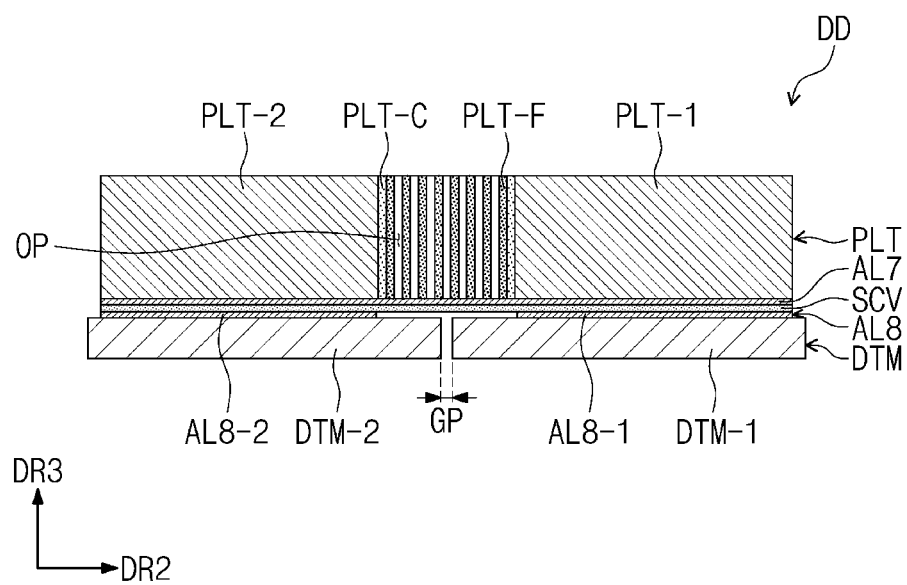
FIG. 4E is a schematic partial cross-sectional view of a display device according to an embodiment of the disclosure.
Figure 4F:
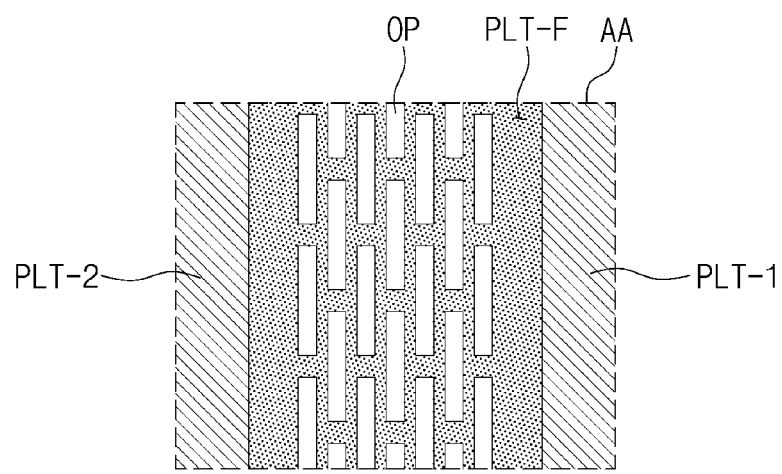
FIG. 4F is a schematic partial plan view of a support layer according to an embodiment of the disclosure.
Figure 4G:
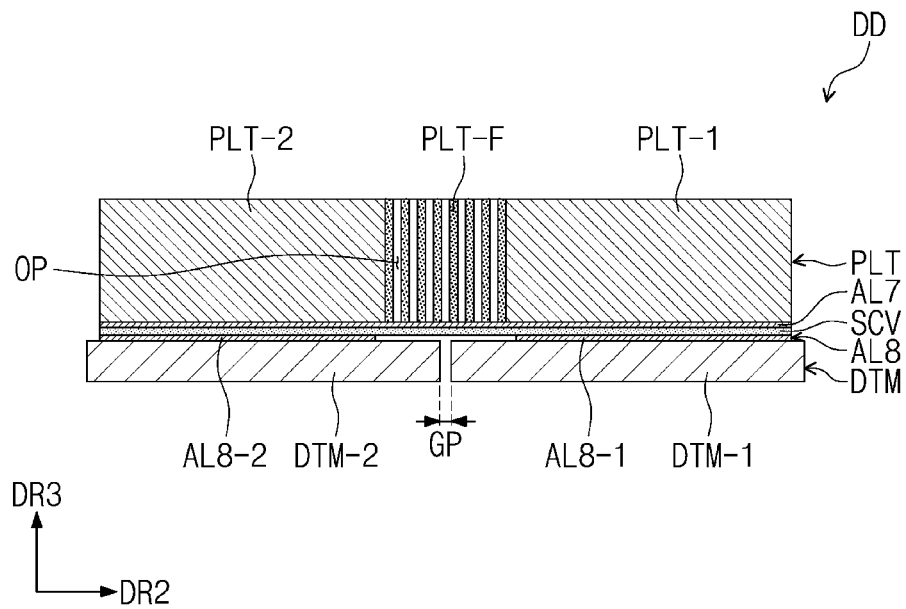
FIG. 4G is a schematic partial cross-sectional view of a display device according to an embodiment of the disclosure.
Figure 4H:
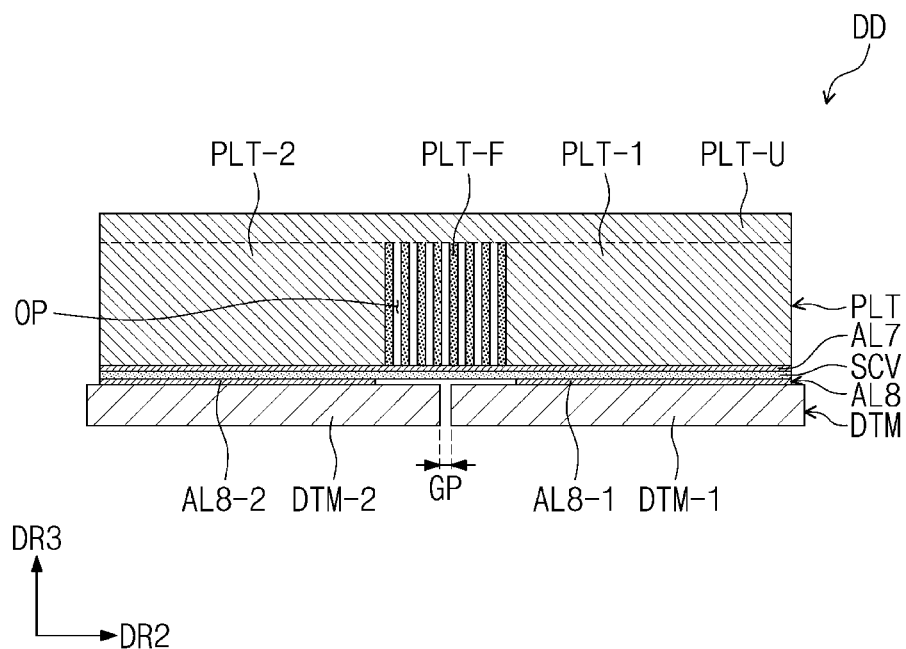
FIGS. 4H to 4I are schematic partial cross-sectional views of a display device according to an embodiment of the disclosure.
Figure 4I:
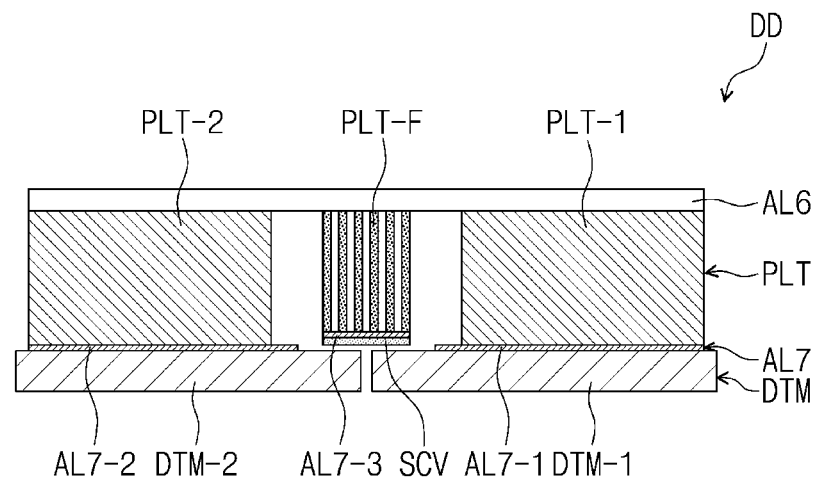
Figure 4J:
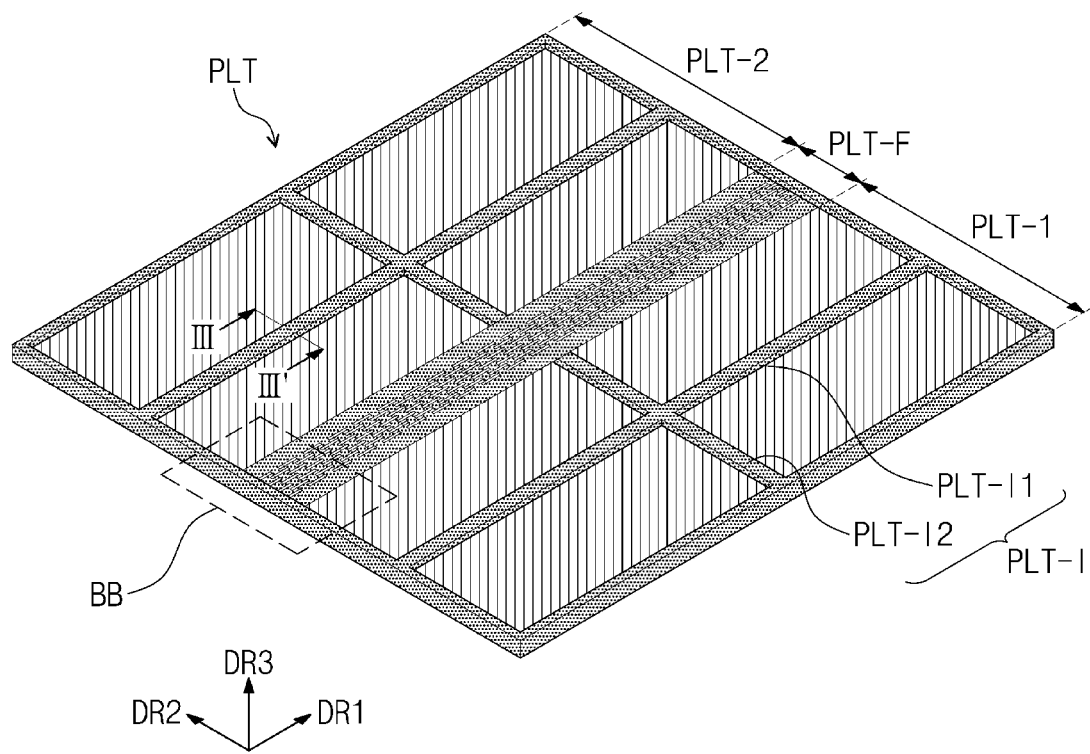
FIG. 4J is a schematic plan view of a support layer according to an embodiment of the disclosure.
Figure 4K:
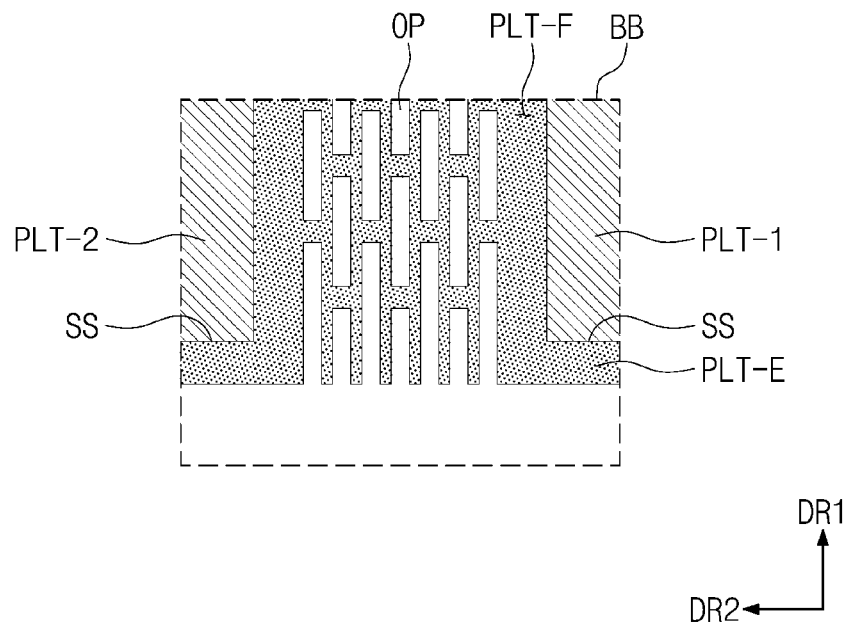
FIG. 4K is a schematic partial plan view of a support layer according to an embodiment of the disclosure.
Figure 4L:
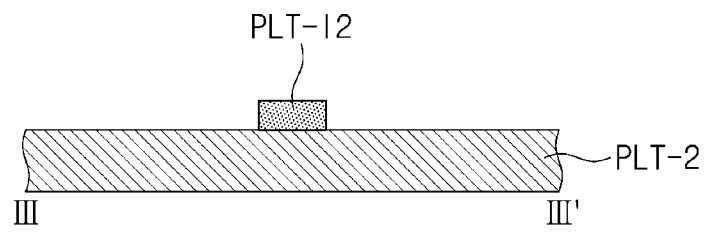
FIG. 4L is a schematic cross-sectional view of a support layer according to an embodiment of the disclosure.
Figure 4M:
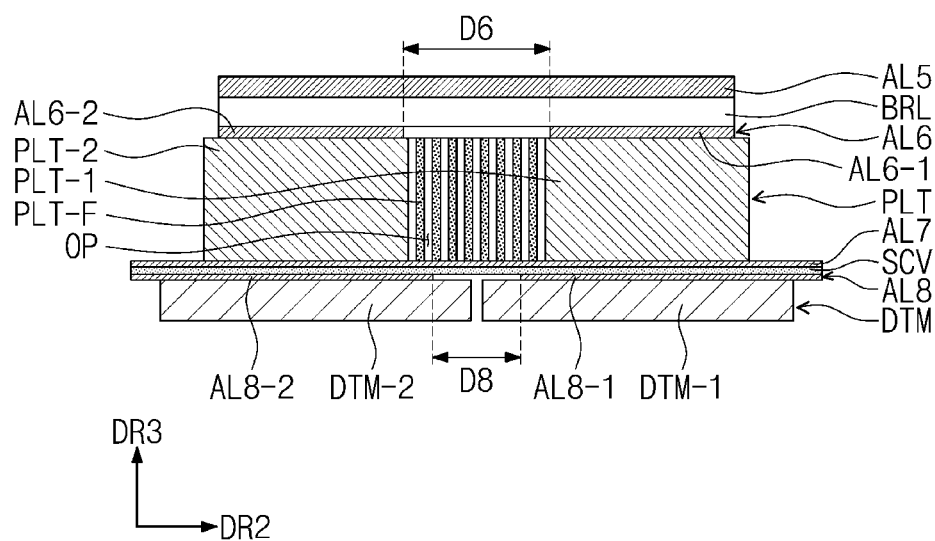
FIG. 4M is a schematic partial cross-sectional view of a support layer according to an embodiment of the disclosure.

FIG. 4A is a schematic plan view of a support layer PLT according to an embodiment. FIG. 4B is a schematic partial plan view of a support layer PLT according to an embodiment. FIG. 4C is a schematic partial cross-sectional view of a display device DD according to an embodiment. FIG. 4D is a schematic partial plan view of a support layer PLT according to an embodiment. FIG. 4E is a schematic partial cross-sectional view of a display device DD according to an embodiment. FIG. 4F is a schematic partial plan view of a support layer PLT according to an embodiment. FIG. 4G is a schematic partial cross-sectional view of a display device DD according to an embodiment. FIGS. 4H and 4I are schematic partial cross-sectional views of a display device DD according to an embodiment. FIG. 4J is a schematic plan view of a support layer PLT according to an embodiment. FIG. 4K is a schematic partial plan view of a support layer PLT according to an embodiment. FIG. 4L is a schematic plan view of a support layer PLT according to an embodiment. FIG. 4M is a schematic partial cross-sectional view of a display device according to an embodiment. The partial cross-sectional views of the display device DD illustrated below are enlarged views of some of the elements illustrated in FIG. 3B.

Referring to FIGS. 4A to 4C, in a plan view, the folding part PLT-F may be spaced apart from the first support part PLT-1 and the second support part PLT-2. As illustrated in FIG. 4B, the folding part PLT-F may be spaced apart from the first support part PLT-1 and the second support part PLT-2 by a first distance D1. The first distance D1 may be about several micrometers to about several tens of micrometers. FIG. 4B is an enlarged view of a portion AA of FIG. 4A.

As illustrated in FIG. 4B, the openings OP formed in the folding part PLT-F may be disposed in a lattice shape. As in FIG. 1B, in case that the electronic device ED is folded, the folding part PLT-F may be elongated and may thus be more readily folded.

The folding part PLT-F, the first support part PLT-1, and the second support part PLT-2 may be bonded to the seventh adhesive layer AL7 as illustrated in FIG. 4C. Thus, in case that the electronic device ED is folded as in FIG. 1B, the folding part PLT-F, the first support part PLT-1, and the second support part PLT-2 which are separate from each other may operate as a single member.

As illustrated in FIGS. 4D and 4E, the support layer PLT may further include coupling parts PLT-C respectively coupled to the folding part PLT-F, the first support part PLT-1, and the second support part PLT-2. The coupling parts PLT-C may be disposed in a region in which the folding part PLT-F and the first support part PLT-1 are spaced apart from each other and in a region in which the folding part PLT-F and the second support part PLT-2 are spaced apart from each other. The coupling parts PLT-C may include plastic and couple the folding part PLT-F to each of the first support part PLT-1 and the second support part PLT-2 by an insert molding method.

After the folding part PLT-F is disposed in a mold so as to be spaced apart from the first support part PLT-1 and the second support part PLT-2, the coupling parts PLT-C may be formed by injecting thermoplastic plastic in the region in which the folding part PLT-F and the first support part PLT-1 are spaced apart from each other and in the region in which the folding part PLT-F and the second support part PLT-2 are spaced apart from each other. The coupling parts PLT-C may be formed in a state in which a film for covering the openings OP of the folding part PLT-F is attached to the folding part PLT-F.

As illustrated in FIGS. 4F and 4G, the first support part PLT-1 and the second support part PLT-2 may each be directly coupled to the folding part PLT-F. The first support part PLT-1 and the second support part PLT-2 may include plastic. The first support part PLT-1 and the second support part PLT-2 may each be coupled to the folding part PLT-F by an insert molding method.

As illustrated in FIG. 4H, the support layer PLT may further include a flattened part PLT-U that is integral with the first support part PLT-1 and the second support part PLT-2 and disposed on the folding part PLT-F, the first support part PLT-1, and the second support part PLT-2. In an embodiment, an interface may be formed between the flattened part PLT-U, and the first support part PLT-1 and the second support part PLT-2.

As illustrated in FIG. 4I, the support layer PLT may include a folding part PLT-F, a first support part PLT-1, and a second support part PLT-2 which are spaced apart from each other in the second direction DR2. As illustrated in FIG. 3B, the integrate sixth adhesive layer AL6 may be bonded to the folding part PLT-F, the first support part PLT-1, and the second support part PLT-2. Thus, in case that the electronic device ED is folded as in FIG. 1B, the folding part PLT-F, the first support part PLT-1, and the second support part PLT-2 which are separate from each other may operate as a single member.

Different from the embodiment as illustrated in FIG. 3B, a seventh adhesive layer AL7 including three portions may be used. The first portion AL7-1 may bond the first support part PLT-1 to the first digitizer DTM-1. The second portion AL7-2 may bond the second support part PLT-2 to the second digitizer DTM-2. The third portion AL7-3 may bond the folding part PLT-F to the cover layer SCV. Different from the embodiment as illustrated in FIG. 3B, the cover layer SCV may not overlap the first support part PLT-1 and the second support part PLT-2. Different from the embodiment as illustrated in FIG. 3B, the eighth adhesive layer AL8 may be omitted.

As illustrated in FIGS. 4J and 4L, the support layer PLT may further include an edge part PLT-E which extends from the folding part PLT-F and surrounds side surfaces SS of the first support part PLT-1 and the second support part PLT-2. The edge part PLT-E may surround portions or the entirety of the first support part PLT-1 and the second support part PLT-2 which do not contact the folding part PLT-F. FIG. 4K is an enlarged view of a region BB of FIG. 4J.

The support layer PLT may further include a reinforcing part PLT-I which overlaps corresponding portions of the first support part PLT-1 and the second support part PLT-2 and extends from a side to another side of the edge part PLT-E. This embodiment illustrates a first reinforcing part PLT-I1 and a second reinforcing part PLT-I2 which respectively overlap the first support part PLT-1 and the second support part PLT-2. The first reinforcing part PLT-I1 and the second reinforcing part PLT-I2 may extend in the first and second directions DR1 and DR2 intersecting each other. In an embodiment, at least one of the first reinforcing part PLT-I1 and the second reinforcing part PLT-I2 may be omitted. In an embodiment, first reinforcing parts PLT-I1 and second reinforcing parts PLT-I2 may be disposed.

FIG. 4M illustrates a cross-section from the panel protection layer PPL to the digitizer DTM. A distance D8 between the first portion AL8-1 and the second portion AL8-2 of the eighth adhesive layer AL8 may be smaller than the width of the folding region FA0. The distance D8 between the first portion AL8-1 and the second portion AL8-2 of the eighth adhesive layer AL8 may be smaller than the distance D6 between the first portion AL6-1 and the second portion AL6-2 of the sixth adhesive layer AL6.

In a plan view, the entirety of the folding part PLT-F may be disposed in the region between the first portion AL6-1 and the second portion AL6-2 of the sixth adhesive layer AL6, and a portion of the folding part PLT-F may be disposed in the region between the first portion AL8-1 and the second portion AL8-2 of the eighth adhesive layer AL8.

The above-described structure may be formed such that the first portion AL8-1 and the second portion AL8-2 of the eighth adhesive layer AL8 may overlap the folding part PLT-F. The coupling of the folding part PLT-F to the digitizer DTM may be reinforced by the overlap of the first portion AL8-1 and the second portion AL8-2 and both edge portions of the folding part PLT-F. Even in case that the display device DD is folded, the eighth adhesive layer AL8 may securely bond the folding part PLT-F to the digitizer DTM in the third direction DR3.

Figure 5B:
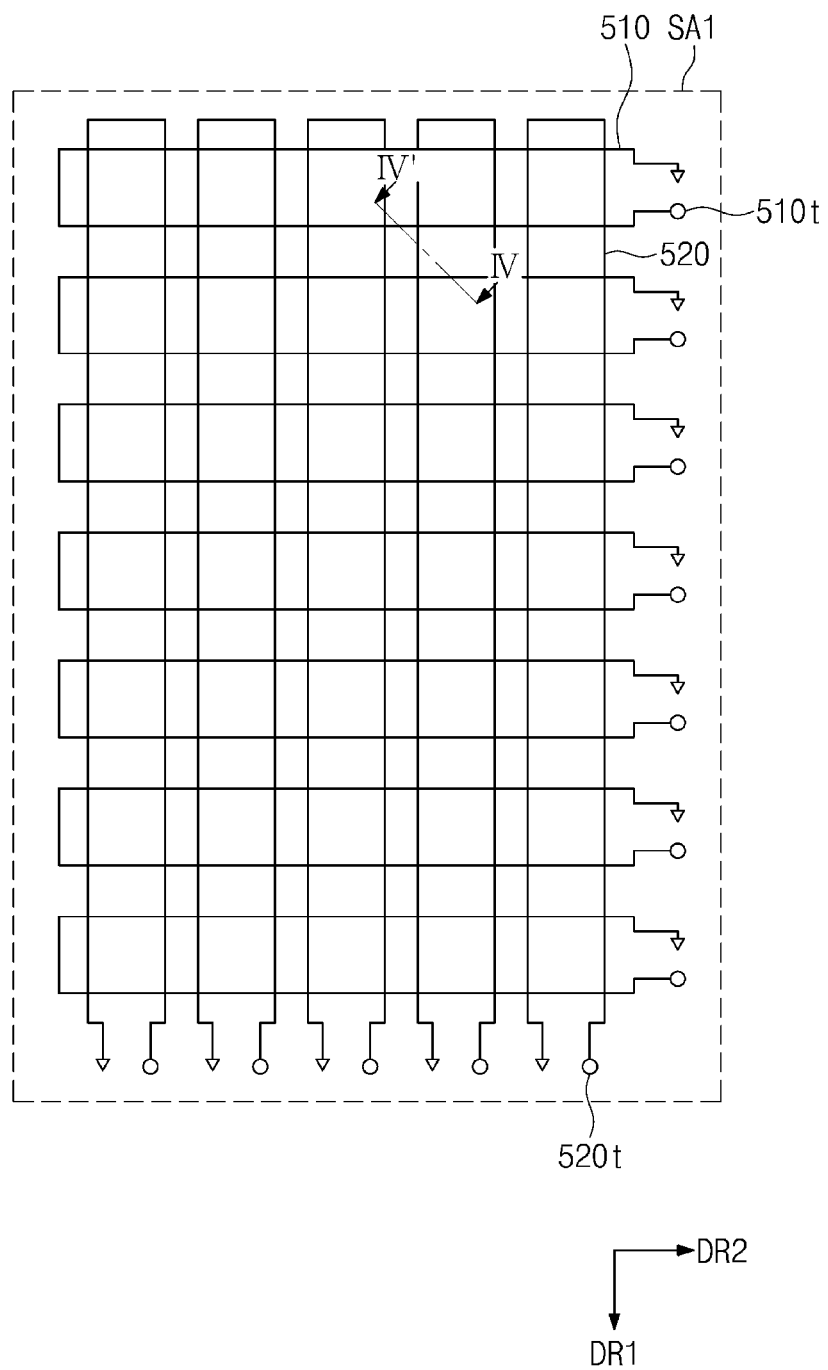
FIG. 5B is a schematic plan view of a sensing region of a digitizer according to an embodiment of the disclosure.
Figure 5C:
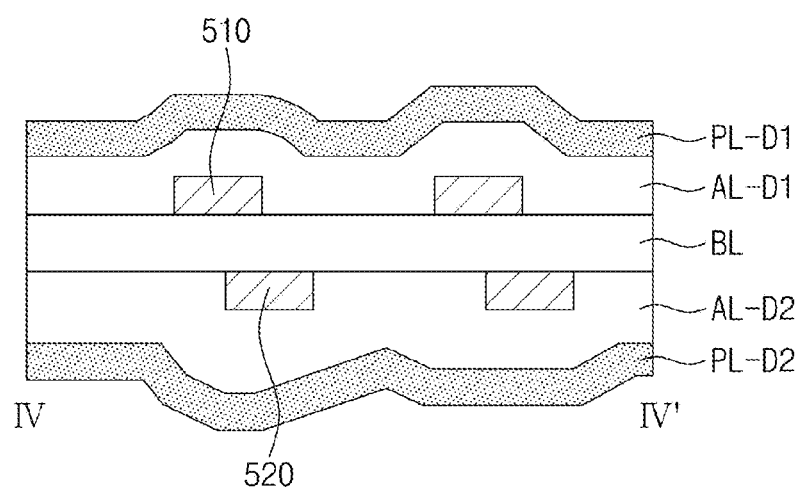
FIG. 5C is a schematic cross-sectional view of a sensing region of a digitizer according to an embodiment of the disclosure.
Figure 5D:
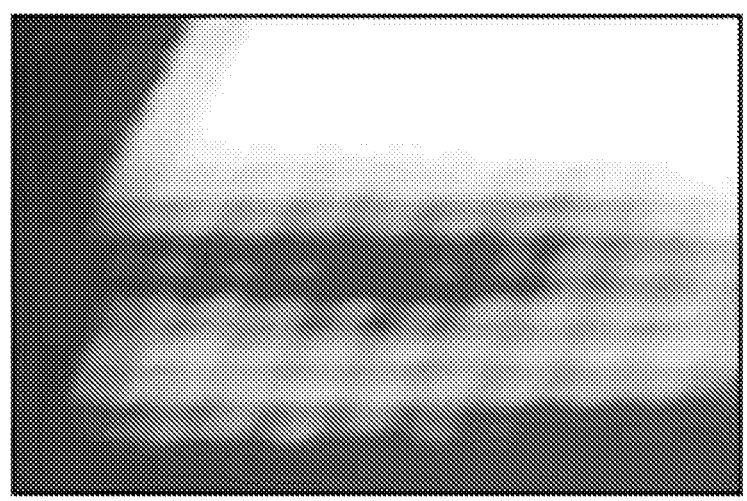
FIG. 5D is a schematic image obtained by imaging a digitizer according to an embodiment of the disclosure.
Figure 5E:
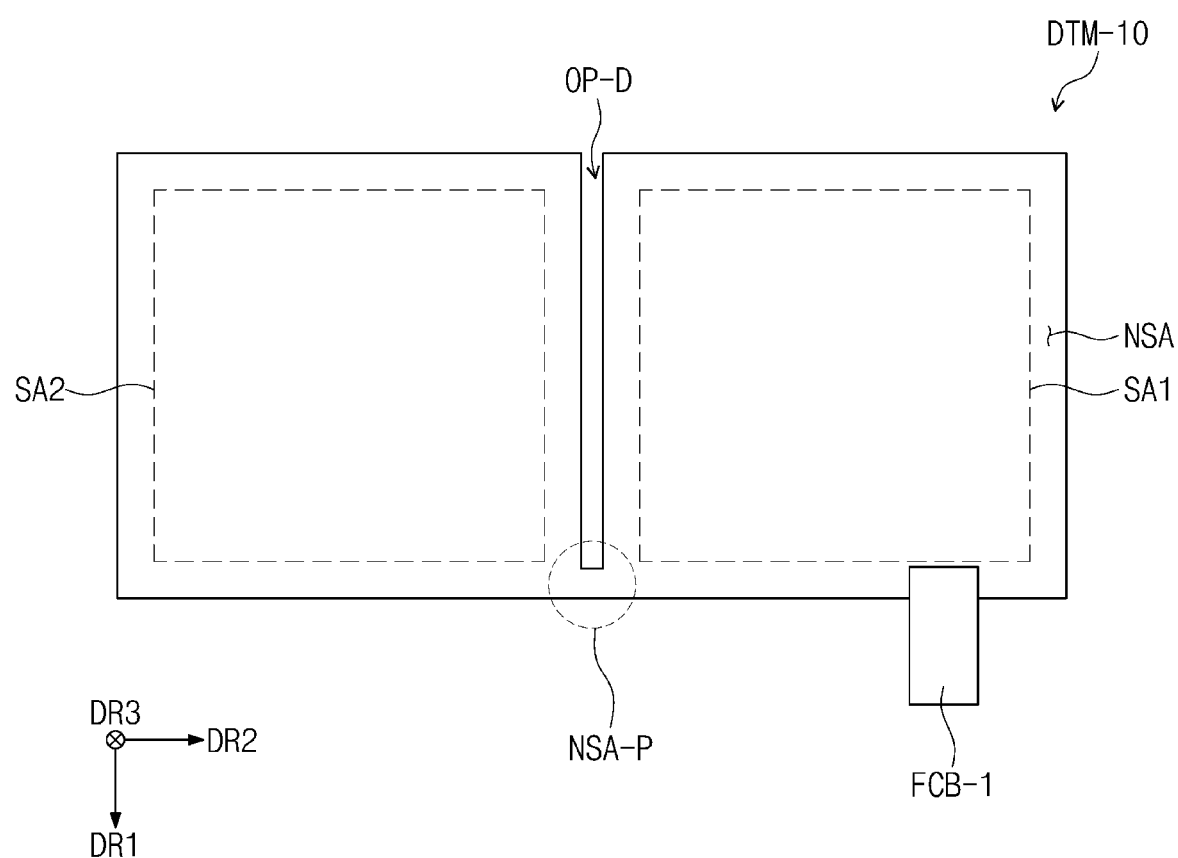
FIG. 5E is a schematic plan view of a digitizer according to an embodiment of the disclosure.

FIG. 5A is a schematic plan view of a digitizer DTM according to an embodiment. FIG. 5B is a schematic plan view of a sensing region SA1 of a digitizer DTM according to an embodiment. FIG. 5C is a schematic cross-sectional view of a sensing region SA1 (along line IV-IV' of FIG. 5B) of a digitizer DTM according to an embodiment. FIG. 5D is an image obtained by imaging a digitizer according to an embodiment. FIG. 5E is a schematic plan view of a digitizer DTM-10 according to an embodiment.

As illustrated in FIG. 5A, the digitizer DTM may include a first digitizer DTM-1 and a second digitizer DTM-2. A first flexible circuit film FCB1 and a second flexible circuit film FCB2 may respectively be electrically connected to the first digitizer DTM-1 and the second digitizer DTM-2. The first flexible circuit film FCB1 and a second flexible circuit film FCB2 may be electrically connected to a same circuit board. The first flexible circuit film FCB1 and the second flexible circuit film FCB2 may respectively be electrically connected to a main circuit board to which the flexible circuit film FCB illustrated in FIG. 2A is electrically connected. The first flexible circuit film FCB1 and the second flexible circuit film FCB2 may be replaced with a single circuit film.

The first digitizer DTM-1 and the second digitizer DTM-2 may respectively include a first sensing region SA1 and a second sensing region SA2 and respectively include a first non-sensing region NSA1 and a second non-sensing region NSA2. The first non-sensing region NSA1 and the second non-sensing region NSA2 may be disposed adjacent to the first sensing region SA1 and the second sensing region SA2. The configurations of the first digitizer DTM-1 and the second digitizer DTM-2 are substantially the same, and the first digitizer DTM-1 will be mainly described hereinafter.

As illustrated in FIG. 5B, the sensing region SA1 may include first loop coils 510 (hereinafter referred to as first coils) and second loop coils 520 (hereinafter referred to as second coils). The first coils 510 may be referred to as drive coils, and the second coils 520 may be referred to as sensing coils, but the embodiment is not limited thereto, and the first coils 510 and the second coils 520 may be reversed with each other.

The first coils 510 may be each arranged in the first direction DR1 and extend in the second direction DR2. The second coils 520 may each extend in the first direction DR1 and be spaced apart from each other in the second direction DR2. Unlike in FIG. 5B, the first coils 510 may be arranged so that adjacent coils thereof overlap each other. Bridge patterns may be disposed in regions in which the first coils 510 intersect each other. The second coils 520 may be arranged so that adjacent coils thereof overlap each other. Bridge patterns may be disposed in regions in which the second coils 520 intersect each other.

An alternating current (AC) current may sequentially be provided to first terminals 510t of the first coils 510. Terminals other than the first terminals 510t of the first coils 510 may be grounded. Signal lines may be electrically connected to each of the first terminals 510t of the first coils 510, but the signal lines are not illustrated in FIG. 5B. These signal lines may be disposed in the non-sensing region NSA1 illustrated in FIG. 5A.

In case that a current flows in the first coils 510, magnetic lines of force may be induced between the first coils 510 and the second coils 520. The second coils 520 may sense induced electromagnetic force discharged from an electronic pen and output the force as a sensed signal to second terminals 520t of the second coils 520. Terminals other than the second terminals 520t of the second coils 520 may be grounded. Signal lines may be electrically connected to each of the second terminals 520t of the second coils 520, but the signal lines are not illustrated in FIG. 5B. These signal lines may be disposed in the non-sensing region NSA1 illustrated in FIG. 5A.

As illustrated in FIG. 5C, the first digitizer DTM-1 may include a base layer BL, first coils 510 disposed on a surface of the base layer BL, and second coils 520 disposed on another surface of the base layer BL. The base layer BL may include a plastic film, for example, a polyimide film. The first coils 510 and the second coils 520 may include metal such as gold (Au), silver (Ag), copper (Cu), or aluminum (Al).

A protective layer which protects the first coils 510 and the second coils 520 may be disposed on the surface and the other surface of the base layer BL. In this embodiment, the protective layer may include a first protective layer PL-D1 disposed on the first coils 510 and bonded by a first adhesive layer AL-D1 and a second protective layer PL-D2 disposed on the second coils 520 and bonded by a second adhesive layer AL-D2. The first protective layer PL-D1 and the second protective layer PL-D2 may each include plastic, for example, a polyimide film.

As illustrated in FIG. 5C, protrusions and recesses may be formed on the upper and lower surfaces of a first digitizer DTM-1. As illustrated in FIG. 5D, this may cause defects in which in case that the display device DD is viewed from above a window module WM, the first coils 510 and the second coils 520 are visually recognized by a used. However, according to an embodiment, as described in FIGS. 4A to 4K, the first support part PLT-1 and the second support part PLT-2 may prevent the protrusions and the recesses formed by the first coils 510 and the second coils 520, from being visually recognized from above. Therefore, the support layer PLT may prevent defects in which the first coils 510 and the second coils 520 disposed thereunder are visually recognized from above the display device DD.

As described above, since the first support part PLT-1 and the second support part PLT-2 have insulating property, a magnetic field may pass through the support layer PLT. The digitizer DTM disposed under the support layer PLT may sense an external input. In case that a support part formed as a metal plate is used in the digitizer DTM, a magnetic field may be shielded by the metal plate, and thus the sensitivity of the digitizer DTM may decrease, but the embodiments avoid such issues.

As illustrated in FIG. 5E, the digitizer DTM-10 may include a first sensing region SA1, a second sensing region SA2, and a non-sensing region NSA. An opening OP-D may be defined between the first sensing region SA1 and the second sensing region SA2. As illustrated in FIG. 1B, an opening OP-D may be disposed in a region corresponding to a folding region FA of an electronic device ED, so that in case that the electronic device ED is folded, the stress occurring in the digitizer DTM-10 may be decreased. FIG. 5E illustrates, as an example, the opening OP-D extending in the first direction DR1, but the embodiment is not limited thereto. A portion extending in the second direction DR2 from the opening OP-D may further be defined.

The opening OP-D may not be formed in the non-sensing region NSA, and a region disposed between the first sensing region SA1 and the second sensing region SA2 may be defined as a passage region NSA-P. The opening OP-D may not extend to the passage region NSA-P. Signal lines electrically connected to loop coils disposed in the second sensing region SA2 may pass through the passage region NSA-P. Ends of these signal lines may be aligned in a bonding region of a flexible circuit film FCB-1. Ends of signal lines electrically connected to loop coils disposed in the first sensing region SA1 may also be aligned in the bonding region. Therefore, the first sensing region SA1 and the second sensing region SA2 may be activated by a single flexible circuit film FCB-1.

Figure 6A:
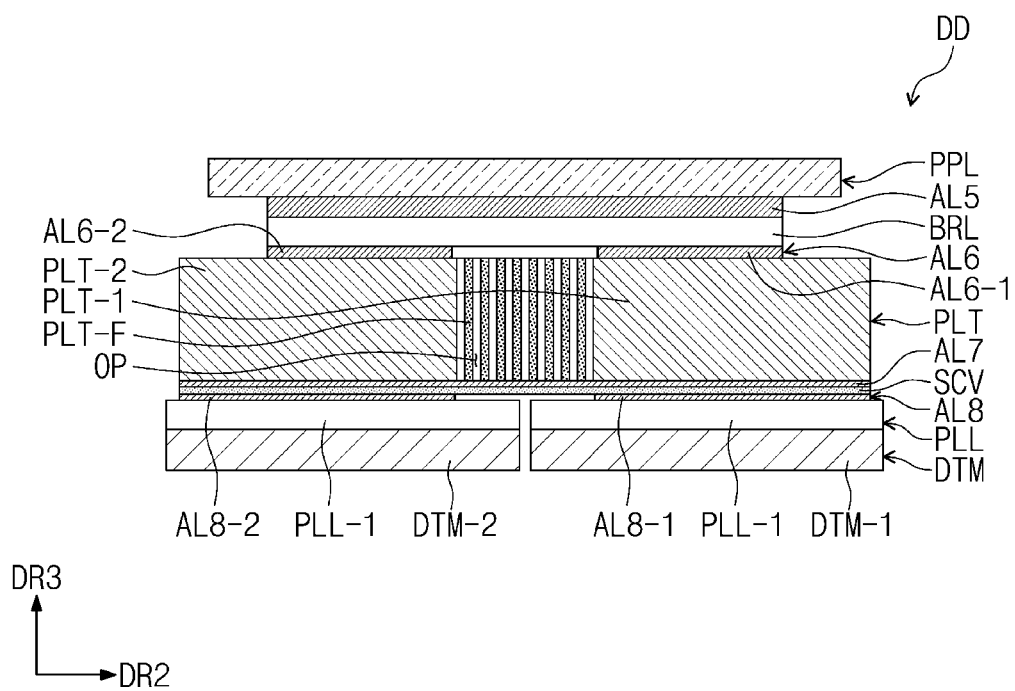
FIG. 6A is a schematic partial cross-sectional view of a display device according to an embodiment of the disclosure.
Figure 6B:
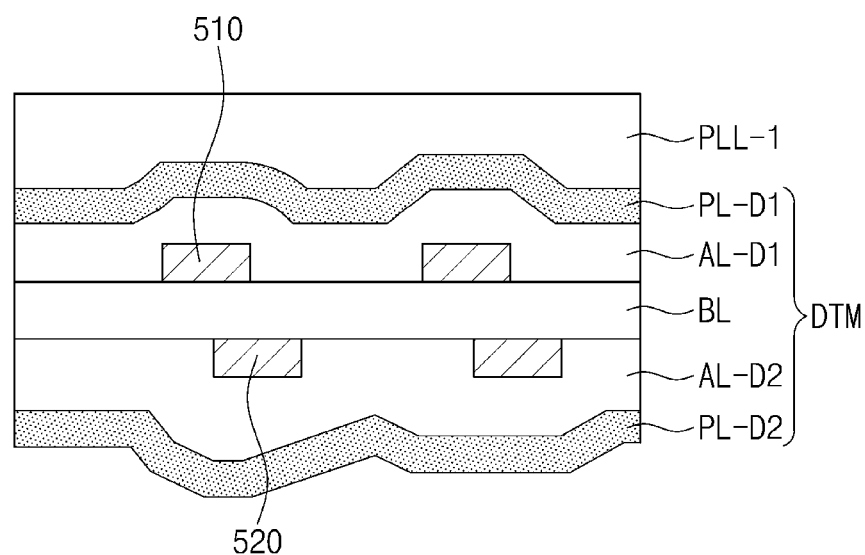
FIG. 6B is a schematic plan view of a sensing region of a digitizer according to an embodiment of the disclosure.
Figure 6C:
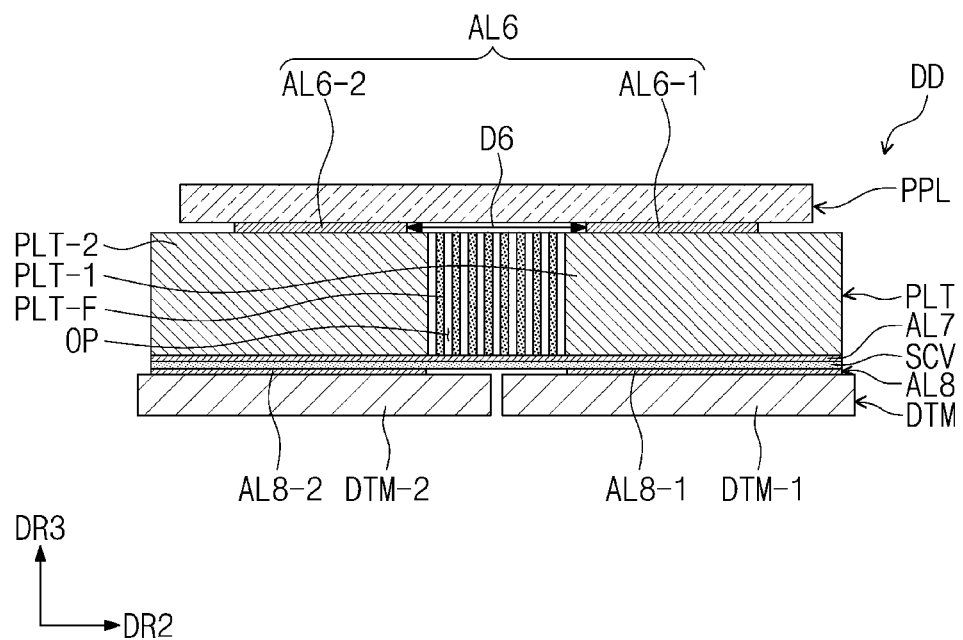
FIG. 6C is a schematic partial cross-sectional view of a display device according to an embodiment of the disclosure.
Figure 6D:
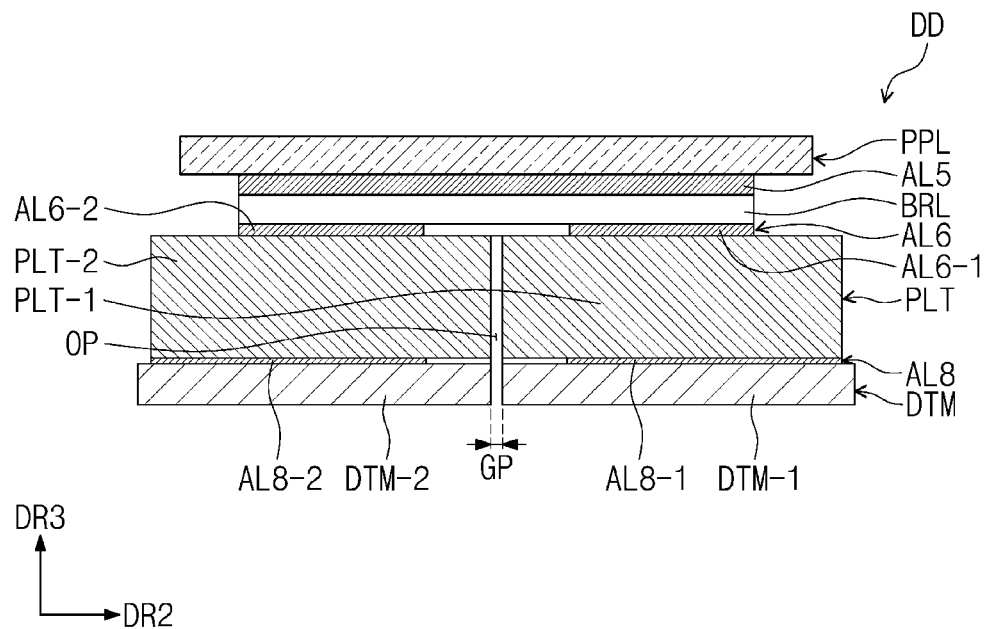
FIG. 6D is a schematic partial cross-sectional view of a display device according to an embodiment of the disclosure.

FIG. 6A is a schematic partial cross-sectional view of a display device DD according to an embodiment. FIG. 6B is a schematic cross-sectional view of a digitizer DTM according to an embodiment. FIG. 6C is a schematic partial cross-sectional view of a display device DD according to an embodiment. FIG. 6D is a schematic partial cross-sectional view of a display device DD according to an embodiment. FIGS. 6A, 6C, and 6D illustrate enlarged views of some elements of a display device DD, and FIG. 6B illustrates a cross-section corresponding to that of FIG. 5C.

Referring to FIGS. 6A and 6B, the display device may further include a flattened layer PLL disposed on the upper surface of the digitizer DTM. The flattened layer PLL may be disposed between an eighth adhesive layer AL8 and the digitizer DTM and remove protrusions and recesses formed on the upper surface of the digitizer DTM.

The flattened layer PLL may include a first flattened layer PLL-1 and a second flattened layer PLL-2 which respectively correspond to a first digitizer DTM-1 and a second digitizer DTM-2. As illustrated in FIG. 6B, the first flattened layer PLL-1 may directly be disposed on a first protective layer PL-D1.

The flattened layer PLL may include at least one of a resin layer or an adhesive layer. The resin layer may be coated on the upper surface of the digitizer DTM. The adhesive layer may be an optically clear adhesive (OCA) member, may further include a separate adhesive layer from an eighth adhesive layer AL8, and may increase the thickness of the eighth adhesive layer AL8 that may also be an OCA member.

Referring to FIG. 6C, in another embodiment, different from the embodiments described above, the fifth adhesive layer AL5 and the barrier layer BRL may be omitted. A sixth adhesive layer AL6 may bond a panel protection layer PPL to a support layer PLT. A first portion AL6-1 of the sixth adhesive layer AL6 may bond a panel protection layer PPL to a first support part PLT-1, and a second portion AL6-2 of the sixth adhesive layer AL6 may bond the panel protection layer PPL to a second support part PLT-2.

Referring to FIG. 6D, different from the embodiments described above, a folding part PLT-F is omitted. The cover layer SCV and the seventh adhesive layer AL7 are also omitted. A gap between a first support part PLT-1 and a second support part PLT-2 may correspond to the above-described gap GP.

Figure 7A:
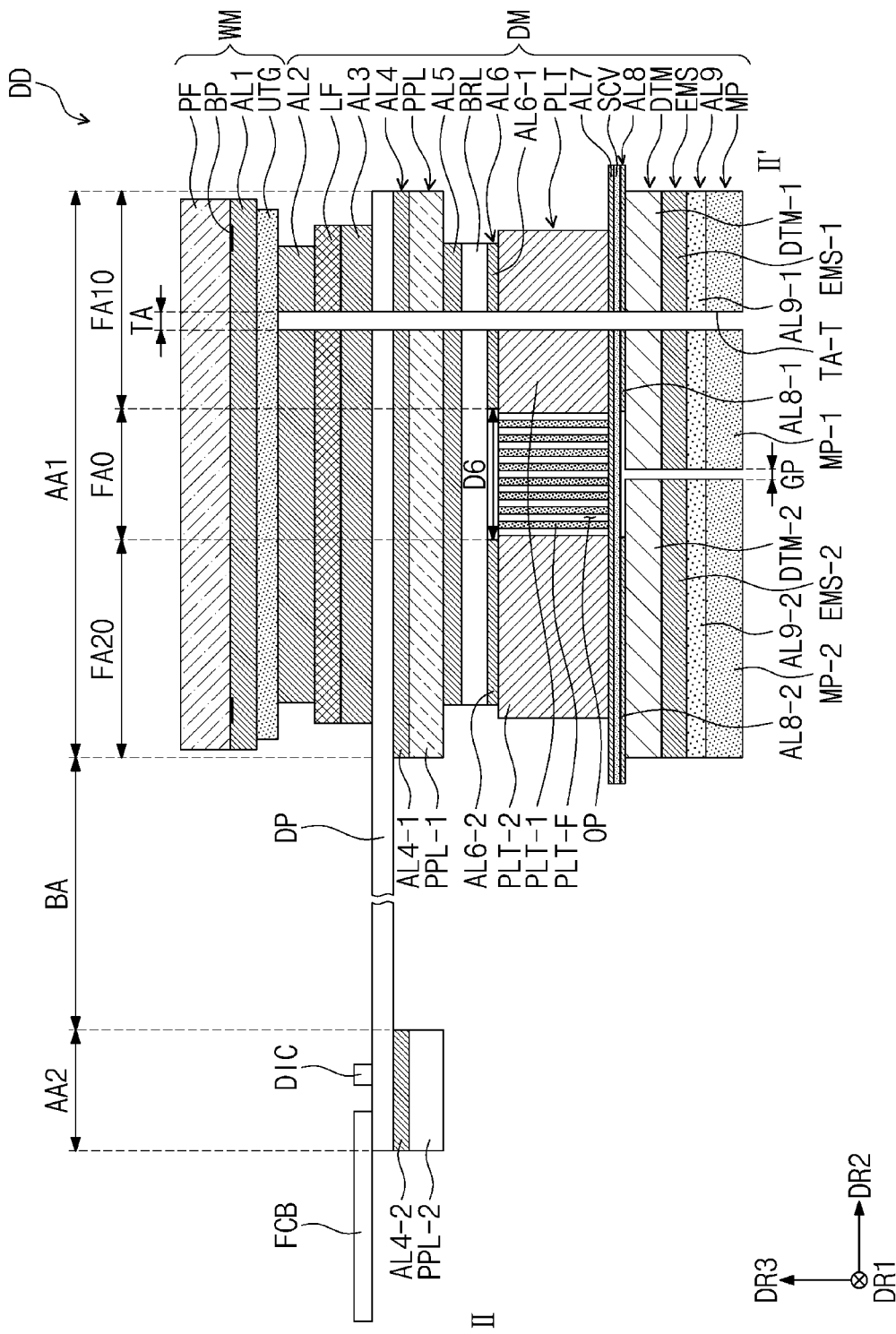
FIG. 7A is a schematic cross-sectional view of a display device according to an embodiment of the disclosure.
Figure 7B:
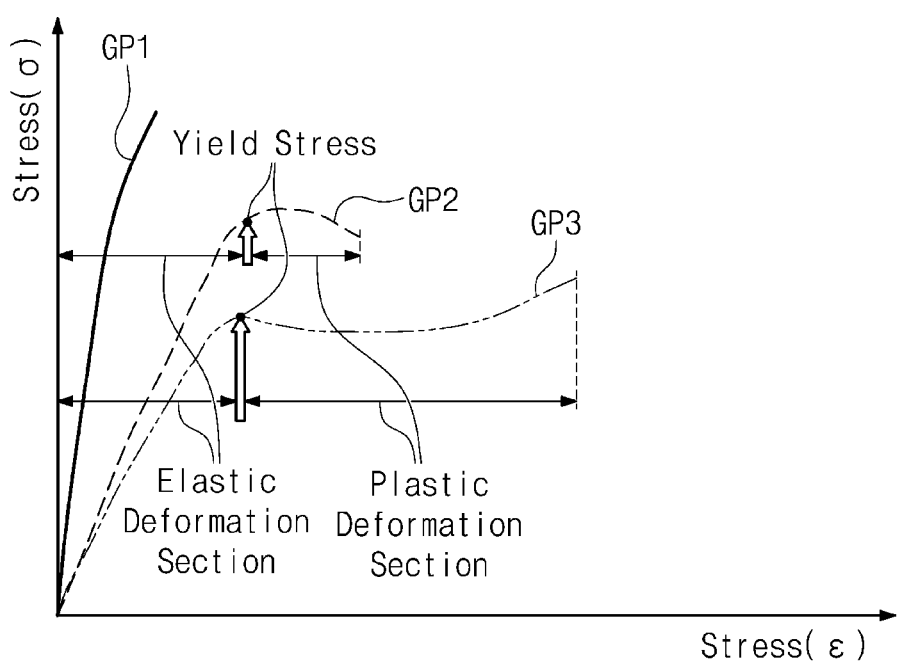
FIG. 7B is a schematic graph illustrating a relationship between strain and stress.

FIG. 7A is a schematic cross-sectional view of a display device DD according to an embodiment. FIG. 7B is a graph illustrating a relationship between strain and stress. FIG. 7A corresponds to FIG. 3B. Hereinafter, detailed descriptions of the same elements as those described above with reference to FIGS. 1A to 6D will be omitted.

Referring to FIG. 7A, a hole TA-T (or an opening) may be formed in a portion of the display device DD in the third direction DR3. The hole TA-T may pass through from a second adhesive layer AL2 to a metal plate MP. The hole TA-T may be formed after the elements of the display device DD illustrated in FIG. 7A are stacked each other, or be formed by stacking elements, in which through-holes are respectively formed, with each other. Although not shown separately in the drawings, the hole TA-T may also pass through from a fifth adhesive layer AL5 to the metal plate MP in an embodiment. This is intended to avoid forming a through-hole in the display panel DP.

As illustrated in FIG. 7A, the through-hole may be formed only in the first support part PLT-1 of the first support part PLT-1 and the second support part PLT-2. While the hole TA-T is formed, the first support part PLT-1 may include plastic, for example, polyethylene terephthalate, to prevent a crack from occurring on the first support part PLT-1. Occurrence of a crack around the through-hole may be prevented by adopting plastic having relatively low brittleness in the first support part PLT-1. Hereinafter, this will be described in detail with reference to FIG. 7B.

First graph GP1 of FIG. 7B illustrates a relationship between strain and stress of glass. Second graph GP2 illustrates a relationship between strain and stress of first type plastic. Third graph GP3 illustrates a relationship between strain and stress of second type plastic.

Since the glass has brittleness, brittle fracture may occur by external stress on the glass. Therefore, the glass may not be suitable for the first support part PLT-1. Since the first support part PLT-1 is disposed in a lower part of the display device DD, a physical interference may occur between the first support part PLT-1 and another elements constituting the electronic device ED. For example, a physical interference may occur between a circuit board of a camera module and the first support part PLT-1. Such a physical interference may cause an additional crack in the first support part PLT-1 in which a through hole is formed.

It is more suitable for the first support part PLT-1 to include a material in which ductile fracture occurs as in plastic. Since a crack may occur in such materials only after a substantial plastic deformation occurs, a crack may not readily occur even in case that a physical interference occurs, for example, between the circuit board of the camera module and the first support part PLT-1.

Second graph GP2 has a plastic deformation section (or a plastic section) smaller than an elastic deformation section (or an elastic section). The first support part PLT-1 may include plastic having a plastic deformation section greater than an elastic deformation section as in third graph GP3. This is because a crack does not occur relatively easily in such plastic. Polyethylene terephthalate may be deformed by external pressure as in third graph GP3.

According to the disclosure, a digitizer disposed under a support layer may sense an external input. This is because a magnetic field signal may pass through the support layer.

A digitizer disposed under the support layer may prevent a defect in which loop coils are visually recognized from above a display panel. This is because a first support part and a second part prevent protrusions and recesses, which are formed by loop coils, from being visually recognized from the above. Defects in the digitizer may be reduced by allowing the digitizer not to overlap a folding region or to overlap only a minimal region even in case that a folding operation is repeated.

So far, embodiments have been described with reference to embodiments. However, it will be understood by those skilled in the art that various modifications and variations can be made in the disclosure without departing from the spirit and technical area of the disclosure be set forth in claims. Therefore, the technical scope of the disclosure shall not be limited to the contents described in the detailed description of the specification, but determined by the claims.

What is claimed is:

1. A display device comprising:
    a display panel comprising:
        a first non-folding region;
        a second non-folding region; and
        a folding region disposed between the first non-folding region and the second non-folding region; and
    a lower member disposed below the display panel,
    wherein the lower member comprises:
        a support layer comprising:
            a first support part disposed below the first non-folding region;
            a second support part disposed below the second non-folding region; and
            a folding part disposed below the folding region, disposed between the first support part and the second support part, and including openings;
        a digitizer including a plurality of loops coils and disposed below the first support part and the second support part; and
        a first adhesive layer comprising:
            a first part disposed between the first support part and the first non-folding region and contacted with the first support part; and
            a second part disposed between the second support part and the second non-folding region and contacted with the second support part,
            wherein the first part and the second part do not overlap the folding part.

2. The display device of claim 1, wherein the lower member includes a hole passing through one of the first support part and the second support part.

3. The display device of claim 2, wherein
    the hole passes through the first support part,
    the first support part comprises plastic, and
    the second support part comprises glass fiber-reinforced plastic or glass.

4. The display device of claim 1, wherein
    the lower member further comprises a barrier layer overlapping the folding part, the first support part, and the second support part,
    the first part bonds the first support part to the barrier layer, and
    the second part bonds the second support part to the barrier layer.

5. The display device of claim 4, wherein the lower member further comprises:
    a cover layer overlapping the folding part, the first support part and the second support part; and
    a second adhesive layer bonding the cover layer and the support layer.

6. The display device of claim 5, wherein the lower member further comprises a third adhesive layer bonding the cover layer and the digitizer.

7. The display device of claim 4, wherein
    the lower member further comprises a second adhesive layer,
    the second adhesive layer comprises:
        a third part disposed between the first support part and the digitizer and contacted with the digitizer; and
        a fourth part disposed between the second support part and the digitizer and contacted with the digitizer, and
    the third part and the fourth part do not overlap the folding part and spaced apart from each other.

8. The display device of claim 7, wherein the digitizer comprises:
    a first digitizer comprising a first sensing region disposed below the first support part and contact with the third part; and
    a second digitizer comprising a second sensing region disposed below the second support part, contact with the fourth part and spaced apart from the first digitizer.

9. The display device of claim 7, wherein a distance between the first part and the second part correspond to a width of the folding part.

10. The display device of claim 7, wherein a distance between the third part and the fourth part is smaller than a width of the folding part.

11. The display device of claim 4, wherein
    the lower member further comprises a second adhesive layer,
    the second adhesive layer comprises:
        a third part disposed between the first support part and the digitizer and bonding the first support part and the digitizer; and
        a fourth part disposed between the second support part and the digitizer and bonding the second support part and the digitizer, and
    the third part and the fourth part do not overlap the folding part and spaced apart from each other.

12. The display device of claim 11, wherein the digitizer comprises:
    a first digitizer comprising a first sensing region disposed below the first support part and contact with the third part; and
    a second digitizer comprising a second sensing region disposed below the second support part, contact with the fourth part and spaced apart from the first digitizer.

13. The display device of claim 1, wherein
    the folding part of the support layer is spaced apart from the first support part and the second support part in a plan view, and
    the support layer further comprises:
        a first coupling part disposed between the folding part and the first support part and coupling the folding part to the first support part; and
        a second coupling part disposed between the folding part and the second support part and coupling the folding part to the second support part.

14. The display device of claim 1, wherein
the folding part comprises metal, and
the first support part and the second support part comprise glass, glass fiber-reinforced plastic, or plastic.

15. The display device of claim 1, wherein the first support part and the second support part are directly coupled to the folding part.

16. The display device of claim 15, wherein
the support layer further comprises a flattened part disposed on the folding part, the first support part, and the second support part, and
the flattened part, the first support part, and the second support part are integral with each other.

17. The display device of claim 1, wherein the support layer comprises an edge part extending from the folding part and surrounding side surfaces of the first support part and the second support part.

18. The display device of claim 17, wherein the support layer further comprises a reinforced part overlapping a portion of the first support part and a portion of the second support part and extending from a side of the edge part to another side of the edge part.

19. The display device of claim 1, wherein the lower member further comprises a flattened layer disposed on an upper surface of the digitizer.

20. The display device of claim 19, wherein the flattened layer comprises at least one of an adhesive layer and a resin layer.

* * * * *